United States Patent
Yan et al.

(10) Patent No.: US 12,361,751 B2
(45) Date of Patent: Jul. 15, 2025

(54) TRAINING METHOD FOR EXPRESSION TRANSFER MODEL, EXPRESSION TRANSFER METHOD AND APPARATUS

(71) Applicant: Tencent Technology (Shenzhen) Company Limited, Shenzhen (CN)

(72) Inventors: Yuxuan Yan, Shenzhen (CN); Youcheng Ben, Shenzhen (CN); Qiang Li, Shenzhen (CN); Yang Ding, Shenzhen (CN); Ruixue Shen, Shenzhen (CN); Chao Wang, Shenzhen (CN); Pei Cheng, Shenzhen (CN); Gang Yu, Shenzhen (CN); Bin Fu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 588 days.

(21) Appl. No.: 17/718,158

(22) Filed: Apr. 11, 2022

(65) Prior Publication Data

US 2022/0245961 A1   Aug. 4, 2022

Related U.S. Application Data

(63) Continuation of application No. PCT/CN2021/092344, filed on May 8, 2021.

(30) Foreign Application Priority Data

Jun. 1, 2020   (CN) .......................... 202010484985.5

(51) Int. Cl.
    *G06V 40/16*   (2022.01)
    *G06N 3/0475*  (2023.01)
    *G06N 3/094*   (2023.01)

(52) U.S. Cl.
    CPC ......... *G06V 40/162* (2022.01); *G06N 3/0475* (2023.01); *G06N 3/094* (2023.01);
    (Continued)

(58) Field of Classification Search
    CPC .... G06V 40/16; G06V 40/161; G06V 40/162; G06V 40/168; G06V 40/169;
    (Continued)

(56) References Cited

U.S. PATENT DOCUMENTS 9,996,940 B1   6/2018  Yamasaki et al.
10,229,507 B1  3/2019  Yamasaki et al.
(Continued)

FOREIGN PATENT DOCUMENTS

CN   102254336 A   11/2011
CN   107610209 A   1/2018
(Continued)

OTHER PUBLICATIONS

Nirkin, Yuval, Yosi Keller, and Tal Hassner. "FSGAN: Subject Agnostic Face Swapping and Reenactment." arXiv preprint arXiv: 1908.05932v1 (2019). (Year: 2019).*
(Continued)

*Primary Examiner* — Geoffrey E Summers
(74) *Attorney, Agent, or Firm* — Morgan, Lewis & Bockius LLP

(57) ABSTRACT

Disclosed is a method for training an expression transfer model performed by a computer device, the method including: obtaining a source domain facial image of a first object, a target domain facial image of a second object and a facial feature image associated with the target domain facial image; applying the facial feature image and the source domain facial image to an expression transfer model to obtain a synthesized facial image of the first object; applying the synthesized facial image and the target domain facial
(Continued)

image to a discriminative network model obtain two discrimination results; applying the synthesized facial image and the target domain facial image to an image classification model to obtain a category feature vector for identifying a difference between the synthesized facial image and the target domain facial image; and updating the expression transfer model according to the category feature vector and the discrimination results.

17 Claims, 11 Drawing Sheets

(52) U.S. Cl.
CPC .......... *G06V 40/169* (2022.01); *G06V 40/172* (2022.01); *G06V 40/176* (2022.01)

(58) Field of Classification Search
CPC ....... G06V 40/172; G06V 40/174–176; G06V 10/82; G06V 10/454; G06N 3/0475; G06N 3/04; G06N 3/047; G06N 3/094; G06N 3/08; G06T 2207/20081; G06T 2207/20084

See application file for complete search history.

(56) References Cited

U.S. PATENT DOCUMENTS

2020/0294294 A1* 9/2020 Petriv ................ G06N 3/08
2020/0334867 A1* 10/2020 Chen ................ G06T 11/00

FOREIGN PATENT DOCUMENTS

| CN | 108230239 A | 6/2018 |
| CN | 110084121 A | 8/2019 |
| CN | 111652121 A | 9/2020 |

OTHER PUBLICATIONS

Bao, Jianmin, et al. "Towards Open-Set Identity Preserving Face Synthesis." arXiv preprint arXiv:1803.11182v2 (2018). (Year: 2018).*

Li, Mu, Wangmeng Zuo, and David Zhang. "Deep identity-aware transfer of facial attributes." arXiv preprint arXiv:1610.05586v2 (2016). (Year: 2018).*

Natsume, Ryota, Tatsuya Yatagawa, and Shigeo Morishima. "Fsnet: An identity-aware generative model for image-based face swapping." Computer Vision—ACCV 2018, Perth, Australia, Dec. 2-6, 2018, Revised Selected Papers, Part VI 14. Springer International Publishing, 2019. (Year: 2019).*

Nitzan, Yotam, et al. "Disentangling in latent space by harnessing a pretrained generator." arXiv preprint arXiv:2005.07728v1.(2020) . (Year: 2020).*

Wang, Ting-Chun, et al. "High-Resolution Image Synthesis and Semantic Manipulation with Conditional GANs." 2018 IEEE/CVF Conference on Computer Vision and Pattern Recognition. IEEE, 2018. (Year: 2018).*

Wu, Wayne, et al. "ReenactGAN: Learning to Reenact Faces via Boundary Transfer." European Conference on Computer Vision. Cham: Springer International Publishing, 2018. (Year: 2018).*

Tencent Technology, Indian Office Action, IN Patent Application No. 202247036774, Feb. 7, 2023, 7 pgs.

Tencent Technology, ISR, PCT/CN2021/092344, Jul. 26, 2021, 2 pgs.

Jia Deng et al., "cGAN Based Facial Expression Recognition for Human-Robot Interaction", IEEE Access, Jan. 10, 2019, vol. 7, 13 pgs.

Koh Kakusho et al., "Learning Mapping of Facial Expressions between User and Lifelike Agent in the User's Subjective View for Agent-Mediated Facial Communication", Journal of Japan Society for Fuzzy Theory and Intelligent Informatics, Jun. 15, 2005, vol. 17, No. 3, 18 pgs.

Takuto Yamamoto et al., "Construction of a 3D Face Shape Change Model that can be Intuitively Manipulated with a Smallnumber of Control Points", 2014 Information Processing Society of Japan, Feb. 13, 2014, vol. 2014-CG-154, No. 16, 2 pgs.

Tencent Technology, Japanese Office Action, JP Patent Application No. 2022-554194, Aug. 8, 2023, 9 pgs.

Tencent Technology, WO, PCT/CN2021/092344, Jul. 26, 2021, 5 pgs.

Tencent Technology, IPRP, PCT/CN2021/092344, Dec. 6, 2022, 6 pgs.

* cited by examiner

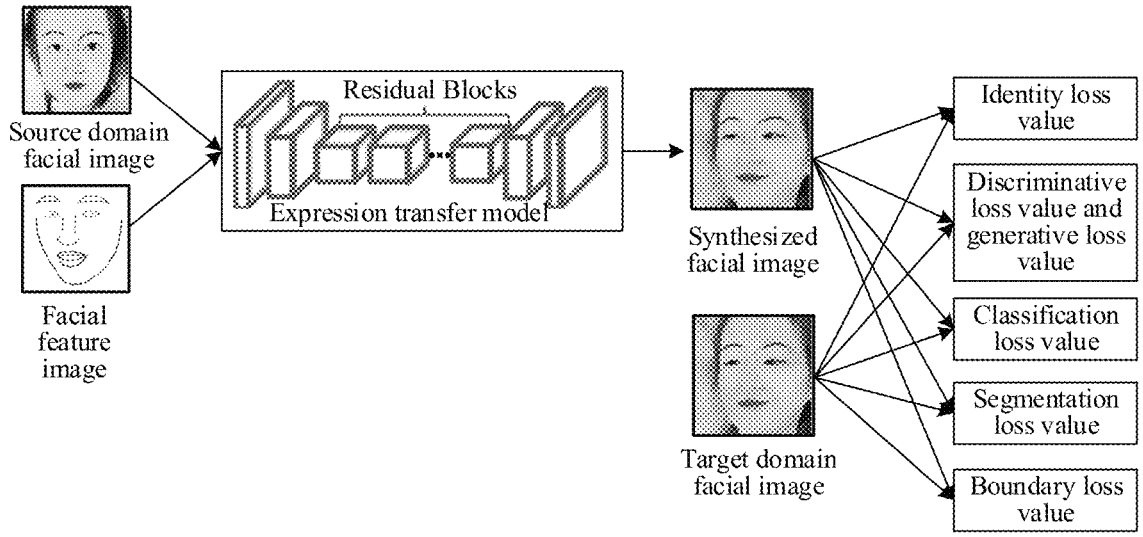

FIG. 5

```
┌─────────────────────────────────────────────────────────────────┐  ╱201
│  Obtain a first image corresponding to a virtual object and a video material │╱
│ corresponding to a real person, the video material including P frames of second│
│            images, and P being an integer greater than or equal to 1          │
└─────────────────────────────────────────────────────────────────┘
                                    │
                                    ▼
┌─────────────────────────────────────────────────────────────────┐  ╱202
│  Obtain, according to the video material, a facial feature image set, the facial │╱
│   feature image set including P facial feature images, and the facial feature    │
│       images being in a one-to-one correspondence with the second images         │
└─────────────────────────────────────────────────────────────────┘
                                    │
                                    ▼
┌─────────────────────────────────────────────────────────────────┐  ╱203
│   Obtain, based on the facial feature image set and the first image and by an    │╱
│   expression transfer model, a synthesized facial video, the synthesized facial  │
│              video including P frames of synthesized facial images               │
└─────────────────────────────────────────────────────────────────┘
                                    │
                                    ▼                                      ╱204
┌─────────────────────────────────────────────────────────────────┐╱
│                      Display the synthesized facial video                        │
└─────────────────────────────────────────────────────────────────┘
```

FIG. 6

TRAINING METHOD FOR EXPRESSION TRANSFER MODEL, EXPRESSION TRANSFER METHOD AND APPARATUS

CROSS-REFERENCE TO RELATED APPLICATIONS

This application is a continuation application of PCT Patent Application No. PCT/CN2021/092344, entitled "METHOD FOR TRAINING EXPRESSION TRANSFER MODEL, AND EXPRESSION TRANSFER METHOD AND APPARATUS" filed on May 8, 2021, which claims priority to Chinese Patent Application No. 202010484985.5, filed with the State Intellectual Property Office of the People's Republic of China on Jun. 1, 2020, and entitled "TRAINING METHOD FOR EXPRESSION TRANSFER MODEL, EXPRESSION TRANSFER METHOD AND APPARATUS", all of which are incorporated herein by reference in their entirety.

FIELD OF THE TECHNOLOGY

The present disclosure relates to the field of artificial intelligence, and specifically to expression transfer.

BACKGROUND OF THE DISCLOSURE

In recent years, facial expression processing and analysis has become a research focus in the fields of computer vision and graphics, and facial expression transfer has also been widely applied. The facial expression transfer refers to mapping a captured facial expression of a real person to another target image, so as to realize transferring the facial expression to the target image.

In the related art, the expression transfer may be performed in a three-dimension (3D) manner. First, a 3D face model needs to be constructed based on a facial image, then processing such as image distortion and fusion is performed based on the 3D face model, to finally realize the facial expression transfer.

SUMMARY

Embodiments of the present disclosure provide a training method for an expression transfer model, an expression transfer method and apparatus, which has no need for complex image processing on facial images, thereby reducing training difficulty and training cost, and also helps the expression transfer model to output more realistic facial images, thereby enhancing a model performance of the expression transfer model.

According to an aspect, the embodiments of the present disclosure provide a training method for an expression transfer model, including:
  obtaining a source domain facial image of a first object, a target domain facial image of a second object and a facial feature image associated with the target domain facial image, the second object being different from the first object;
  obtaining, based on applying the facial feature image and the source domain facial image to an expression transfer model, a synthesized facial image of the first object;
  obtaining, based on applying the synthesized facial image and the target domain facial image to a discriminative network model, a first discrimination result corresponding to the synthesized facial image and a second discrimination result corresponding to the target domain facial image;
  obtaining, based on applying the synthesized facial image and the target domain facial image to an image classification model, a category feature vector, the category feature vector being configured for identifying a difference between the synthesized facial image and the target domain facial image; and
  updating, according to the category feature vector, the first discrimination result and the second discrimination result, the expression transfer model to reduce the difference between the synthesized facial image and the target domain facial image.

According to still another aspect, the embodiments of the present disclosure provide a computer device, including: a memory, a processor, and a bus system, the bus system connecting the memory to the processor;
  the memory being configured to store a plurality of computer programs;
  the processor being configured to execute the plurality of computer programs to perform the aforementioned method for training an expression transfer model.

According to still another aspect, the embodiments of the present disclosure provide a non-transitory computer readable storage medium, storing a plurality of computer programs. The computer programs are configured for performing the aforementioned method for training an expression transfer model.

As can be seen from the foregoing technical solution, the embodiments of the present disclosure have the following advantages:

The embodiments of the present disclosure provide the training method for an expression transfer model. First, the source domain facial image, the target domain facial image and the facial feature image are obtained; and the synthesized facial image is obtained, based on the facial feature image and the source domain facial image and by the expression transfer model to be trained; and the first discrimination result corresponding to the synthesized facial image and the second discrimination result corresponding to the target domain facial image are obtained, based on the synthesized facial image and the target domain facial image and by the discriminative network model; and the category feature vector is obtained, based on the synthesized facial image and the target domain facial image and by the image classification model; and finally, the model parameter of the expression transfer model to be trained is updated according to the category feature vector, the first discrimination result and the second discrimination result, to obtain the expression transfer model. In accordance with the method, during the process of training the expression transfer model, on one hand, there is no need to perform complex image processing on facial images, and the training may be directly completed by using extracted facial images, thereby reducing training difficulty and training cost. On the other hand, based on the discriminative ability of the discriminative network model and the classification ability of the image classification model, it is beneficial for the expression transfer model to output more realistic facial images, thereby enhancing the model performance of the expression transfer model.

BRIEF DESCRIPTION OF THE DRAWINGS

FIG. 5 is a schematic diagram of training an expression transfer model according to an embodiment of the present disclosure.

FIG. 6 is a schematic diagram of an expression transfer method according to an embodiment of the present disclosure.

DESCRIPTION OF EMBODIMENTS

Figure 1:
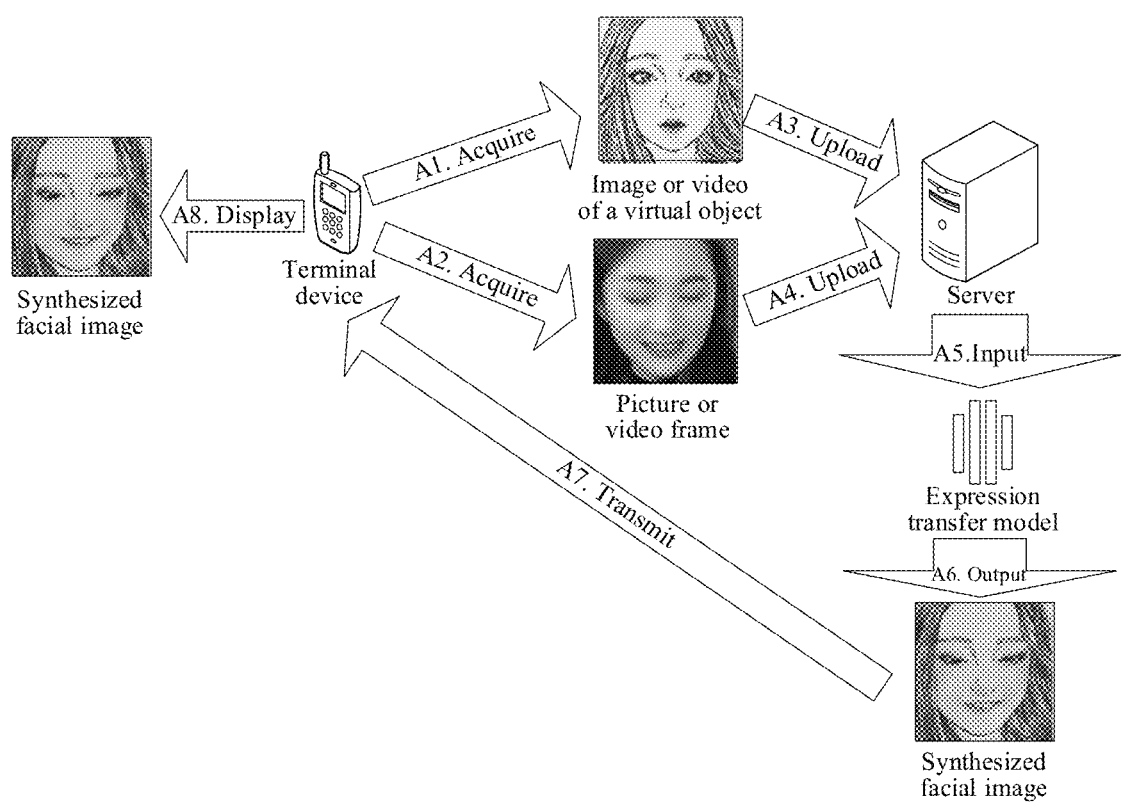
FIG. 1 is a schematic diagram of an expression transfer system according to an embodiment of the present disclosure.

The embodiments of the present disclosure provide a training method for an expression transfer model, an expression transfer method and apparatus, which on one hand does not need to perform complex image processing on facial images, thereby reducing training difficulty and training cost, and on the other hand helps the expression transfer model to output more realistic facial images, thereby enhancing the model performance of the expression transfer model.

The terms such as "first", "second", "third", and "fourth" (if any) in the specification and claims of the present disclosure and in the accompanying drawings are used for distinguishing similar objects and not necessarily used for describing any particular order or sequence. It is to be understood that data used in this way is exchangeable in a proper case, so that the embodiments of the present disclosure described herein can be implemented in an order different from the order shown or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

The expression transfer method provided by the present disclosure may be applied to various application scenarios, including but not limited to, a virtual reality scenario, a digital entertainment scenario and a human-computer interaction scenario. The following describes the expression transfer method provided by the present disclosure in combination with the above scenarios.

In the virtual reality scenario, in order to make a character in a video or an image more vivid, facial expressions of a real person may be transferred to a face of a virtual object (e.g., a cartoon character, an animated character, or a comic character, etc.), to synthesize a virtual character which has the real person's expressions. Such virtual character may appear in live videos, virtual broadcast videos, or virtual shopping guide videos, etc. In a medical field, facial expressions of a real person are transferred to a 3D face model, to synthesize a realistic head model, with which doctors may perform virtual surgery.

In the game entertainment scenario, in order to make a character in a game more vivid, facial expressions of a real person may be transferred to a face of a virtual object (e.g., a game character, or a game animation, etc.), to synthesize a virtual character which has the real person's expressions. This can greatly improve design efficiency and reduce design difficulty as compared with artificially designing the virtual object's expressions.

In the human-computer interaction scenario, in order to make an intelligent customer service more vivid, facial expressions of a real person may be transferred to a face of a virtual object (e.g., a virtual customer service, or a virtual robot, etc.), to synthesize a virtual character which has the real person's expressions. Such virtual character may appear on a human-computer interface, to guide users to perform related operations.

The training method for an expression transfer model and the expression transfer method provided by the present disclosure may be applied to various fields, such as computer vision (CV), image processing, computer graphics, machine learning (ML), human-computer interaction, etc. CV is a scientific field that deals with how computers can be made to see. More specifically, CV refers to a process of using a camera and a computer instead of human eyes to recognize, track and measure targets, and further performing graphics processing, to make images processed by the computer more suitable for human eyes to observe or being transmit to instruments for detection. As a scientific discipline, the CV studies related theories and technologies and attempts to establish an AI system that can obtain information from images or multidimensional data. The CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition. ML is a multi-field interdiscipline, and relates to a plurality of disciplines such as the probability theory, statistics, the approximation theory, convex analysis, and the algorithm complexity theory. The ML specializes in studying how a computer simulates or implements a human learning behavior to obtain new knowledge or skills, and reorganize an existing knowledge structure, so as to keep improving its performance. The ML is the core of the AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

Based on this, AI is a theory, method, technology, and application system that uses digital computers or machines controlled by digital computers to simulate, extend, and expand human intelligence, perceive the environment, acquire knowledge, and use knowledge to obtain the best results. In other words, AI is a comprehensive technology of computer science. AI attempts to understand the essence of intelligence and produce a new kind of intelligent machine that can react in a similar way to human intelligence. AI is to study the design principles and implementation methods of various intelligent machines, so that the machines have the functions of perception, reasoning and decision-making.

AI technology is a comprehensive discipline, covering a wide range of fields, including both hardware-level technology and software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and ML/DL.

In the embodiments of the present disclosure, various types of facial images and facial image features required in the present disclosure may be obtained through technologies related to image processing such as computer vision. In addition, various types of models involved in the embodiments of the present disclosure may be trained and used through artificial intelligence technology and machine learning technology.

Figure 2:
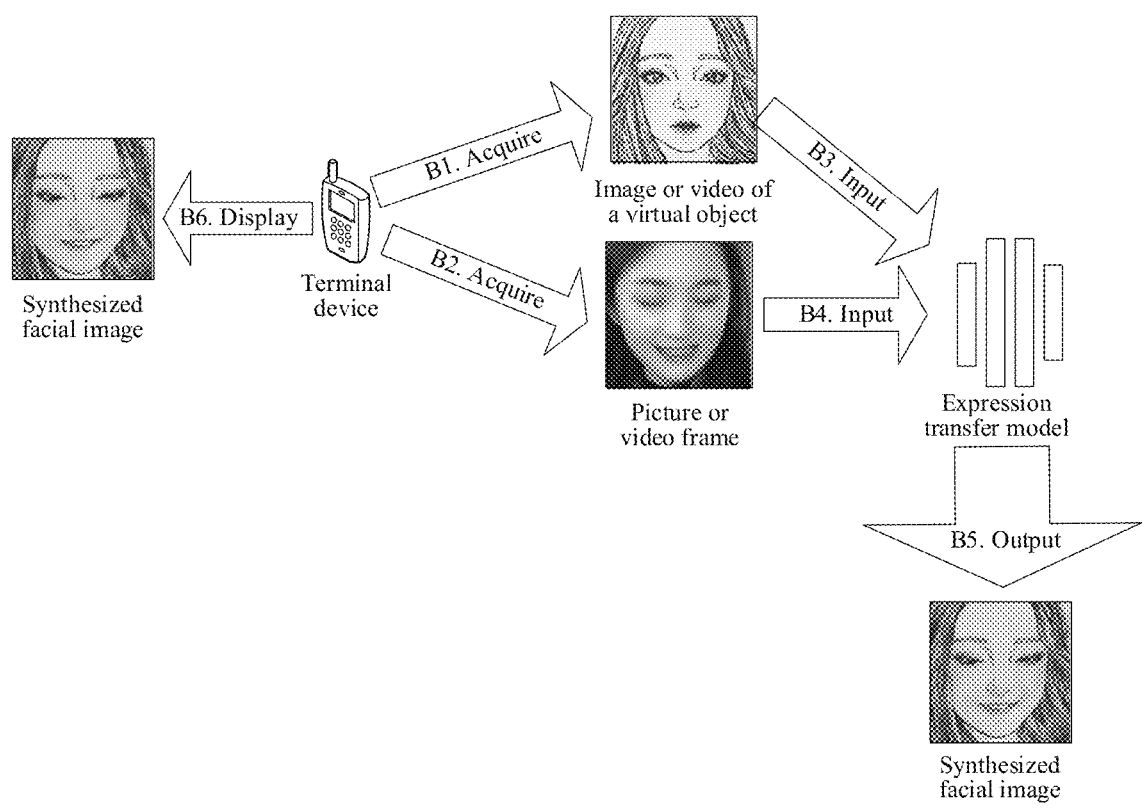
FIG. 2 is another schematic diagram of an expression transfer system according to an embodiment of the present disclosure.

Based on the above scenarios, the present disclosure provides an expression transfer method, which is applied to an expression transfer system as shown in FIG. 1 or FIG. 2. FIG. 1 is a schematic diagram of an expression transfer system according to an embodiment of the present disclosure, and FIG. 2 is another schematic diagram of an expression transfer system according to an embodiment of the present disclosure. First, referring to FIG. 1, as shown in the figure, in an online environment, the expression transfer system includes a terminal device and a server, and an expression transfer model is deployed on a side of the server. The server may communicate with the terminal device. A process of realizing the expression transfer based on the expression transfer system may include:

Step A1. The terminal device acquires a facial image of a virtual object, which may be a video of the virtual object in practical applications.

Step A2. The terminal device acquires a photo or a video including a real person. The present disclosure does not limit an execution order of step A2 and step A1.

Step A3. The terminal device uploads the acquired facial image or video of the virtual object to the server.

Step A4. The terminal device uploads the acquired photo or video of the real person to the server. The present disclosure does not limit an execution order of step A3 and step A4.

Step A5. The server inputs the facial image of the virtual object and the photo of the real person into the expression transfer model, or inputs the facial image of the virtual object and the video of the real person into the expression transfer model, or inputs the video of the virtual object and the photo of the real person into the expression transfer model, or inputs the video of the virtual object and the video of the real person into the expression transfer model.

Step A6. Output, by the expression transfer model, a synthesized facial image or a synthesized facial video.

Step A7. The server transmits the synthesized facial image or the synthesized facial video to the terminal device.

Step A8. The terminal device displays the synthesized facial image or the synthesized facial video.

Referring to FIG. 2, as shown in the figure, in an offline environment, the expression transfer model is deployed on a side of the terminal device. A process of realizing the expression transfer based on the expression transfer system may include:

Step B1. The terminal device acquires a facial image of a virtual object, which may be a video of the virtual object in practical applications.

Step B2. The terminal device acquires a photo or a video including a real person. The present disclosure does not limit an execution order of step B2 and step B1.

Step B3. The terminal device inputs the acquired facial image or video of the virtual object into the local expression transfer model.

Step B4. The terminal device inputs the acquired photo or video of the real person into the local expression transfer model. The present disclosure does not limit an execution order of step B3 and step B4.

Step B5. The terminal device outputs a synthesized facial image or a synthesized facial video by the expression transfer model.

Step B6. The terminal device displays the synthesized facial image or the synthesized facial video.

The server may be an independent physical server, or may be a server cluster including a plurality of physical servers or a distributed system, or may be a cloud server that provides a cloud computing service. The terminal device may be a smartphone, a tablet computer, a notebook computer, a desktop computer, a smart speaker, a smartwatch, or the like, but is not limited thereto. The terminal device and the server may be directly or indirectly connected in a wired or wireless communication manner. This is not limited in the present disclosure.

Figure 3:
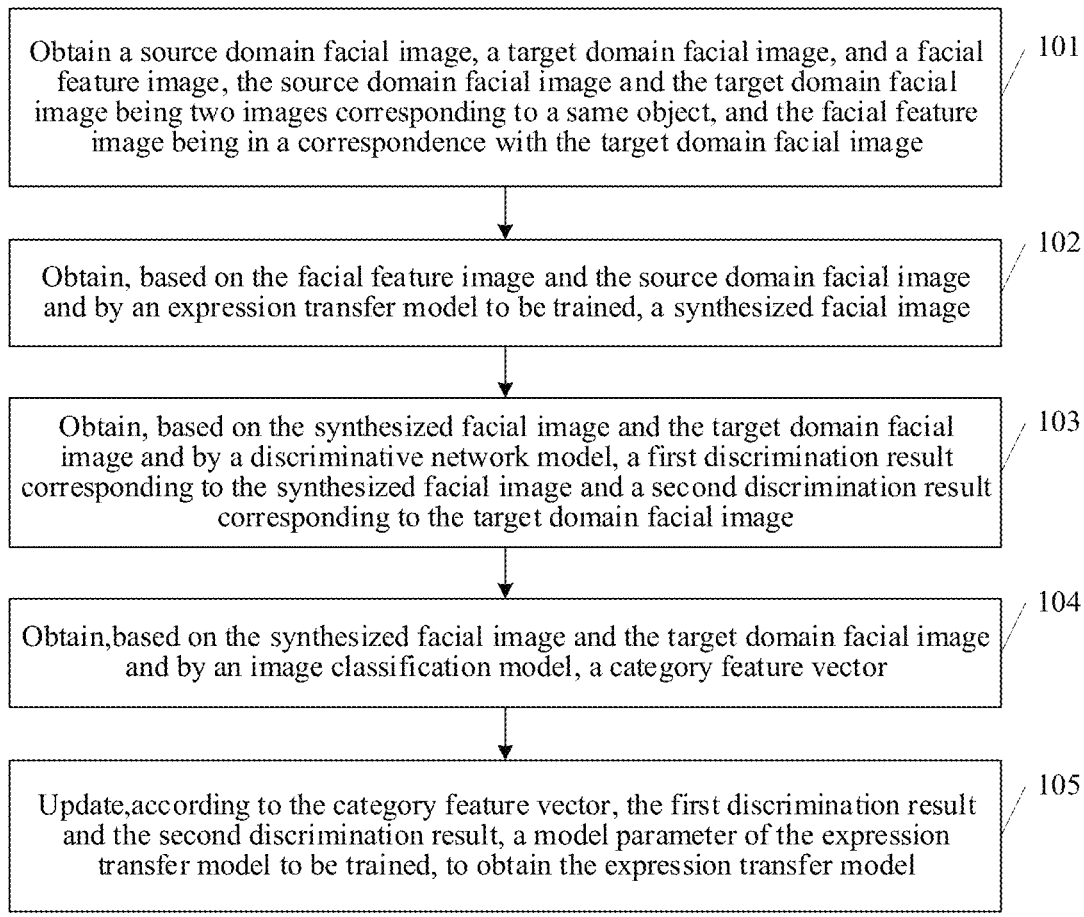
FIG. 3 is a schematic diagram of a training method for an expression transfer model according to an embodiment of the present disclosure.

In combination with the above description, a training method for an expression transfer model provided by the present disclosure is described below. A model training device involved in this embodiment may be the terminal device or the server as shown in FIG. 1 or FIG. 2, or any other terminal device or server for model training. Referring to FIG. 3, a training method for an expression transfer model according to an embodiment of the present disclosure includes:

101. Obtain a source domain facial image of a first object, a target domain facial image of a second object and a facial feature image associated with the target domain facial image. The source domain facial image and the target domain facial image can be two images corresponding to a same object or two different objects (e.g., a virtual character and a real person). The facial feature image is in a correspondence with the target domain facial image.

In this embodiment, training sets need to be prepared before training the expression transfer model. For example, 40000 video datasets (or image datasets) with characters are used. The training sets used in the present disclosure come from real persons or virtual objects. The virtual objects include but are not limited to comic characters, game characters, animated characters, etc.

Exemplarily, it is assumed that the training sets come from video datasets (or image datasets) corresponding to the virtual objects. A source domain facial image and a target domain facial image are extracted from a video (or an image set) of the same virtual person. In addition, a facial feature image corresponding to the target domain facial image is obtained. That is, during the training process, a set of samples includes the source domain facial image, the target domain facial image and the facial feature image belonging to the same virtual object. As an example, the present disclosure uses the video dataset (or the image dataset) of the virtual object for model training, however, which is not to be construed as a limitation on the present disclosure.

Exemplarily, it is assumed that the training sets come from video datasets (or image datasets) corresponding to virtual objects. A source domain facial image and a target domain facial image are extracted from a video (or an image set) of the same real person. In addition, the keypoints are extracted from the target domain facial image, to obtain a corresponding facial feature image. That is, during the training process, a set of samples includes the source domain facial image, the target domain facial image and the facial feature image belonging to the same real person.

Figure 4:
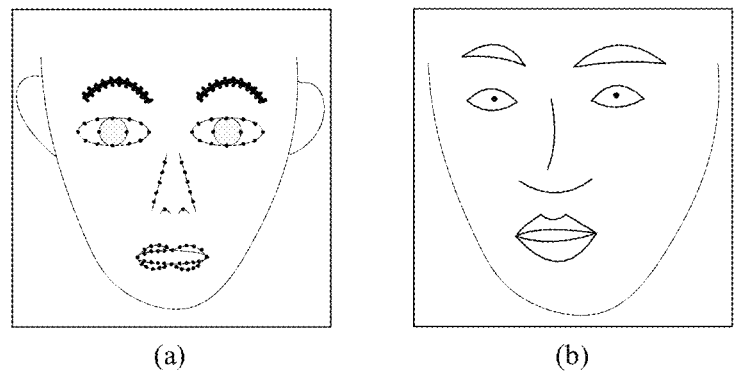
FIG. 4 is a schematic diagram of a facial feature image according to an embodiment of the present disclosure.

The following describes an approach of obtaining a facial feature image with reference to the accompanying drawings. For ease of understanding, FIG. 4 is a schematic diagram of a facial feature image according to an embodiment of the present disclosure. As shown in (a) of FIG. 4, the keypoints may be extracted after the facial image is obtained. For example, a cascaded deep alignment network (DAN) is used to extract the facial keypoints, or a multi-task cascaded convolutional neural network (MTCNN) is used to extract the facial keypoints, or an active shape model (ASM) is used to extract the facial keypoints. Other approaches may be used, which is not limited herein. The facial feature image includes a facial image after the keypoints are extracted, and positions of the keypoints include, but are not limited to, eyebrows, eyes, eyeballs, nose, cheeks, and mouth. The facial feature image may also be constituted by line segments, as shown in (b) of FIG. 4. Line connection processing is performed based on the extracted keypoints, to form the line segments. The facial feature image includes the facial image after the line segments are generated.

The facial feature image may be embodied as a facial image in the form of dots, or embodied as a facial image in the form of line segments, or embodied as a facial image in the form of curves. In the present disclosure, the facial feature image in the form of line segments is described as an example, which, however, is not to be understood as a limitation on present disclosure.

102. Obtain, based on the facial feature image and the source domain facial image and by an expression transfer model to be trained, a synthesized facial image.

In this embodiment, the facial feature image and the source domain facial image are stitched by the model training device, and then inputted into the expression transfer model to be trained, to allow the expression transfer model to be trained to output the synthesized facial image. The source domain facial image is an image with three channels, and the facial feature image is an image with one channel. Thus, a feature image with four channels is formed after the stitching.

The model training device may be deployed in a computer device. The computer device may be the server or the terminal device, which is not limited in the present disclosure.

103. Obtain, based on the synthesized facial image and the target domain facial image and by a discriminative network model, a first discrimination result corresponding to the synthesized facial image and a second discrimination result corresponding to the target domain facial image.

In this embodiment, the model training device inputs the synthesized facial image outputted by the expression transfer model to be trained to the discriminative network model, to allow the discriminative network model to output the first discrimination result. The first discrimination result represents a recognition condition of the synthesized facial image by the discriminative network model. Similarly, the model training device inputs the target domain facial image to the discriminative network model, to allow the discriminative network model to output the second discrimination result. The second discrimination result represents a recognition condition of the target domain facial image by the discriminative network model.

The discriminative network model in the present disclosure may be a network model that has been trained, or a network model that is being trained, which is not limited herein.

104. Obtain, based on the synthesized facial image and the target domain facial image and by an image classification model, a category feature vector.

In this embodiment, the model training device inputs the synthesized facial image to the image classification model, to allow the image classification model to output the category feature vector. The category feature vector represents a feature classification condition of the synthesized facial image and the target domain facial image by the image classification model.

The image classification model in the present disclosure may be a network model that has been trained, or a network model that is being trained, which is not limited herein.

105. Update, according to the category feature vector, the first discrimination result and the second discrimination result, a model parameter of the expression transfer model to be trained, to obtain the expression transfer model to reduce the difference between the synthesized facial image and the target domain facial image.

In this embodiment, the model training device uses a target loss function to calculate a corresponding loss value in combination with the category feature vector, the first discrimination result and the second discrimination result, and optimizes the model parameter of the expression transfer model to be trained based on a backpropagation algorithm. The expression transfer model is obtained when a model convergence condition is reached. There are many situations in which the model convergence condition is reached. For example, when the loss value is less than a preset value, the model convergence condition is considered to be reached. For another example, when a variation of the model parameter between two iterations is less than or equal to a variation threshold, the model convergence condition is considered to be reached. For still another example, when the number of training iterations exceeds a maximum number of iterations, the model convergence condition is considered to be reached.

This embodiment of the present disclosure provides the training method for an expression transfer model. First, the source domain facial image, the target domain facial image and the facial feature image are obtained; and the synthesized facial image is obtained, based on the facial feature image and the source domain facial image and by the expression transfer model to be trained; and the first discrimination result corresponding to the synthesized facial image and the second discrimination result corresponding to the target domain facial image are obtained, based on the synthesized facial image and the target domain facial image and by the discriminative network model; and the category feature vector is obtained, based on the synthesized facial image and the target domain facial image and by the image classification model; and finally, the model parameter of the expression transfer model to be trained is updated according to the category feature vector, the first discrimination result and the second discrimination result, to obtain the expression transfer model. In accordance with the method, during the process of training the expression transfer model, on one hand, there is no need to perform complex image processing on facial images, and the training may be directly completed by using extracted facial images, thereby reducing training difficulty and training cost. On the other hand, based on discriminative ability of the discriminative network model and the classification ability of the image classification model, it is beneficial for the expression transfer model to output more realistic facial images, thereby enhancing the model performance of the expression transfer model.

In some embodiments, on the basis of each embodiment corresponding to FIG. 3, the training method for an expression transfer model provided by the present disclosure, the foregoing step 105 may include the following steps:

using, according to the first discrimination result and the second discrimination result, a first loss function included in the target loss function, to determine a discriminative loss value and a generative loss value;

using, according to the category feature vector, a second loss function included in the target loss function, to determine a classification loss value;

updating the model parameter of the expression transfer model to be trained by minimizing the discriminative loss value, the generative loss value and the classification loss value; and obtaining, when the model convergence condition is reached, the expression transfer model according to the updated model parameter.

In this embodiment, the training method for an expression transfer model is described. The present disclosure describes the synthesis of one frame of facial image as an example. However, in practical applications, the number of images used for one iteration of training is more than one. Therefore, the following gives an example in which M images are used for one iteration of training.

Exemplarily, the present disclosure uses a generative adversarial deep neural network to train the expression transfer model. The generative adversarial deep neural network is a type of neural network, which has a discriminator network structure in addition to a generator network structure as compared with conventional neural networks. The generator (i.e., the expression transfer model or the expression transfer model to be trained) is used to generate an image, and the discriminator (i.e., the discriminative network model) is used to discriminate whether the image (including the synthesized facial image and the target domain facial image) is real or fake. During the training process, iterative training is performed by calculating a difference between the synthesized facial image and the target domain facial image, and an error of the discriminator determining the images. The model parameter of the generator is optimized through the adversarial training process of the generator and the discriminator network, so as to make the synthesized facial image close to the target domain facial image.

Exemplarily, the present disclosure also uses a visual geometry group (VGG) network to train the expression transfer model. The VGG network structure may include a convolutional layer, a fully connected layer, and a softmax output layer. Max-pooling is used to separate these layers. An activation unit of each hidden layer uses a rectified linear unit (ReLU) function. A middle layer of the VGG network may effectively extract image features, so the trained VGG network may be applied in the loss function.

Specifically, it is assumed that the discriminator network is expressed as $D(\cdot)$, the expression transfer model to be trained (or the expression transfer model) is expressed as $G(\cdot)$, an $i^{th}$ source domain facial image is expressed as $z^i$, an $i^{th}$ target domain facial image is expressed as $x^i$, $i^{th}$ facial feature image is expressed as $l^i$, and an $i^{th}$ synthesized facial image is expressed as $G(z^i, l^i)$. Based on above, the second loss function is used to calculate the classification loss value:

$$LossPerceptual = \frac{1}{M} \sum_{i=1}^{M} (VGG(G(z^i, l^i), x^i));$$

where LossPerceptual represents the classification loss value, M represents a total number of images used for one iteration of training, $VGG(\cdot)$ represents the VGG network, and $VGG(G(z^i,l^i),x^i)$ represents the category feature vector outputted by the VGG network.

The model training device updates the model parameter of the expression transfer model to be trained, based on the discriminative loss value, the generative loss value and the classification loss value obtained in one iteration of training, and obtain the corresponding expression transfer model until the model convergence condition is reached.

This embodiment of the present disclosure provides the training method for an expression transfer model. In accordance with the method, the first loss function is used to determine whether the synthesized facial image and the target domain facial image are real or fake, so as to make the expression transfer model to output the image whose style is closer to a target domain style; and the second loss function is used to better compare the image features of the synthesized facial image and the target domain facial image, so as to allow the expression transfer model to output the image whose image features are closer to the target domain image features, thereby enhancing the realism of the synthesized facial image.

In some embodiments, on the basis of each embodiment corresponding to FIG. 3, the training method for an expression transfer model provided by the present disclosure, the operation of using, according to the first discrimination result and the second discrimination result, a first loss function included in the target loss function, to determine a discriminative loss value and a generative loss value may include the following steps:

- using, according to the first discrimination result and the second discrimination result, a discriminative loss function included in the first loss function, to obtain a target discriminative sub-loss value;
- determining, when M discriminative sub-loss values are obtained, the discriminative loss value according to the M discriminative sub-loss values, the M discriminative sub-loss values including the target discriminative sub-loss value, and M being an integer greater than or equal to 1;
- using, according to the first discrimination result, a generative loss function included in the first loss function, to obtain a target generative sub-loss value; and
- determining, when M generative sub-loss values are obtained, the generative loss value according to the M generative sub-loss values, the M generative sub-loss values including the target generative sub-loss value.

In this embodiment, an approach of determining the discriminative loss value and the generative loss value is described. The present disclosure describes the synthesis of one frame of facial image as an example. However, in practical applications, the number of images used for one iteration of training is more than one. Therefore, the following gives an example in which M images are used for one iteration of training.

Specifically, it is assumed that the discriminator network is expressed as $D(\cdot)$, the expression transfer model to be trained (or the expression transfer model) is expressed as $G(\cdot)$, an $i^{th}$ source domain facial image is expressed as $z^i$, an $i^{th}$ target domain facial image is expressed as $x^i$, $i^{th}$ facial feature image is expressed as $l^i$, and an $i^{th}$ synthesized facial image is expressed as $G(z^i, l^i)$. Based on above, the first discrimination result is obtained as $D(G(z^i, l^i))$, and the second discrimination result is obtained as $D(x^i)$. The first loss function includes the discriminative loss function and the generative loss function. The target discriminative sub-loss value is calculated as follows:

$$LossD^i = -[\log D(x^i) + \log(1 - D(G(z^i, l^i)))];$$

where $LossD^i$ represents the target discriminative sub-loss value.

In a case that the M discriminative sub-loss values are obtained, the following discriminative loss function is used to calculate the discriminative loss value:

$$LossD = -\frac{1}{M}\sum_{i=1}^{M}[\log D(x^i) + \log(1 - D(G(z^i, l^i)))];$$

where $LossD$ represents the discriminative loss value, and M represents a total number of images used for one iteration of training.

The target discriminative sub-loss value is calculated as follows:

$$LossG^i = -[\log(D(G(z^i, l^i)))];$$

where $LossG^i$ represents the target generative sub-loss value.

In a case that the M generative sub-loss values are obtained, the following generative loss function is used to calculate the generative loss value:

$$LossG = -\frac{1}{M}\sum_{i=1}^{M}[\log(D(G(z^i, l^i)))];$$

where $LossG$ represents the generative loss value, and M represents a total number of images used for one iteration of training.

During the training process, the model parameter of the expression transfer model to be trained is updated with the goal of minimizing the discriminative loss value and the generative loss value.

This embodiment of the present disclosure provides an approach of determining the discriminative loss value and the generative loss value. In accordance with this approach, the discriminative loss function and the generative loss function are used as the first loss function, to discriminate whether the synthesized facial image is real or fake, which is advantageous to enhancing the realism of the synthesized facial image, thereby making a style of the synthesized facial image closer to that of the target domain image.

In some embodiments, on the basis of each embodiment corresponding to FIG. 3, the training method for an expression transfer model provided by the present disclosure, the training method may further include the following steps:

- obtaining, based on the synthesized facial image and by a face recognition model, a first identity feature; and
- obtaining, based on the target domain facial image and by the face recognition model, a second identity feature.

The foregoing step 105 may include the following steps:

- using, according to the first identity feature and the second identity feature, a third loss function included in the target loss function, to obtain a target identity sub-loss value;
- determining, when M identity sub-loss values are obtained, an identity loss value according to the M identity sub-loss values, the M identity sub-loss values including the target identity sub-loss value;
- updating the model parameter of the expression transfer model to be trained by minimizing the discriminative loss value, the generative loss value, the classification loss value and the identity loss value, the discriminative loss value and the generative loss value being determined according to the first discrimination result and the second discrimination result, and the classification loss value being determined according to the category feature vector; and
- obtaining, when the model convergence condition is reached, the expression transfer model according to the updated model parameter.

In this embodiment, an approach of determining the identity loss value is described. The present disclosure describes the synthesis of one frame of facial image as an example. However, in practical applications, the number of images used for one iteration of training is more than one. Therefore, the following gives an example in which M images are used for one iteration of training.

Exemplarily, the present disclosure uses the face recognition model to train the expression transfer model. The face recognition model may use a VGG network, a light convolutional neural network (light CNN), or any other deep neural network, which is not limited herein. In order to make a face in the synthesized facial image to maintain the same identity as a face in the target domain facial image, the face recognition model may be used to penalize a facial identity offset. That is, the face recognition model is used to respectively extract an identity feature of the synthesized facial image and an identity feature of the target domain facial image, and make the two closer.

Specifically, it is assumed that the expression transfer model to be trained (or the expression transfer model) is expressed as $G(\cdot)$, an $i^{th}$ source domain facial image is expressed as $z^i$, an $i^{th}$ target domain facial image is expressed as $x^i$, an $i^{th}$ facial feature image is expressed as $l^i$, and an $i^{th}$ synthesized facial image is expressed as $G(z^i, l^i)$. Based on the above, the target identity sub-loss value is calculated as follows:

$$LossIdentity^i = -\cos(\theta(G(z^i, l^i)), \theta(x^i));$$

where LossIdentity$^i$ represents the target identity sub-loss value, $\theta(\cdot)$ represents the face recognition model, and COS($\cdot$) represents calculation of a cosine value between the two features.

In a case that the M identity sub-loss values are obtained, the following third loss function is used to calculate the identity loss value:

$$LossIdentity = -\frac{1}{M}\sum_{i=1}^{M}(\cos(\theta(G(z^i, l^i)), \theta(x^i)));$$

where LossIdentity represents the identity loss value, and M represents a total number of images used for one iteration of training. During the training process, the model parameter of the expression transfer model to be trained is updated with the goal of minimizing the discriminative loss value, the generative loss value, the classification loss value and the identity loss value.

Further, this embodiment of the present disclosure provides an approach of determining the identity loss value. In accordance with this approach, the third loss function is used to fit the identity feature between the synthesized facial image and the target domain facial image, so as to make the synthesized facial image and the target domain facial image to have consistent identities, thereby avoiding inconsistency of the facial identities.

In some embodiments, on the basis of each embodiment corresponding to FIG. 3, the training method for an expression transfer model provided by the present disclosure, the training method may further include the following steps:

obtaining, based on the synthesized facial image and by a boundary extraction model, a first boundary feature, the first boundary feature including a feature corresponding to facial boundary points in the synthesized facial image; and obtaining, based on the target domain facial image and by the boundary extraction model, a second boundary feature, the second boundary feature including a feature corresponding to facial boundary points in the target domain facial image.

The foregoing step 105 may include the following steps:

using, according to the first boundary feature and the second boundary feature, a fourth loss function included in the target loss function, to obtain a target boundary sub-loss value;

determining, when M boundary sub-loss values are obtained, a boundary loss value according to the M boundary sub-loss values, the M boundary sub-loss values including the target boundary sub-loss value;

updating the model parameter of the expression transfer model to be trained by minimizing the discriminative loss value, the generative loss value, the classification loss value and the boundary loss value, the discriminative loss value and the generative loss value being determined according to the first discrimination result and the second discrimination result, and the classification loss value being determined according to the category feature vector; and obtaining, when the model convergence condition is reached, the expression transfer model according to the updated model parameter.

In this embodiment, an approach of determining the boundary loss value is described. The present disclosure describes the synthesis of one frame of facial image as an example. However, in practical applications, the number of images used for one iteration of training is more than one. Therefore, the following gives an example in which M images are used for one iteration of training.

Exemplarily, the present disclosure uses the boundary extraction model to train the expression transfer model. The boundary extraction model may use a multi-task cascaded convolutional network (MTCNN), a deep alignment network (DAN), facial landmark detection network (dlib) or any other deep neural network, which is not limited herein. In order to make the face in the synthesized facial image to have the same size and position as the face in the target domain facial image, the boundary extraction model may be used to penalize a facial position offset. That is, the boundary extraction model is used to respectively extract the boundary feature of the synthesized facial image and the boundary feature of the target domain facial image, and make the two closer.

Specifically, it is assumed that the expression transfer model to be trained (or the expression transfer model) is expressed as $G(\cdot)$, an $i^{th}$ source domain facial image is expressed as $z^i$, an $i^{th}$ target domain facial image is expressed as $x^i$, an $i^{th}$ facial feature image is expressed as $l^i$, and an $i^{th}$ synthesized facial image is expressed as $G(z^i, l^i)$. Based on above, the target boundary sub-loss value is calculated as follows:

$$LossBoundary^i = smmothL1(\eta G(z^i, l^i), \eta(x^i));$$

where LossBoundary$^i$ represents the target boundary sub-loss value, $\eta(\cdot)$ represents the boundary extraction model, and smmothL1 represents calculation of a smooth L1 loss between the two features. The smmothL1 function is a piecewise function, which is L2 loss in the [−1,1] interval, solving the problem that L1 is non-smooth, and is L1 loss outside the [−1,1] interval, solving the problem of outliers exploding gradient problem.

In a case that the M boundary sub-loss values are obtained, the following fourth loss function is used to calculate the boundary loss value:

$$LossBoundary = \frac{1}{M}\sum_{i=1}^{M}(smmothL1(\eta G(z^i, l^i), \eta(x^i)));$$

where LossBoundary represents the boundary loss value, and M represents a total number of images used for one iteration of training. During the training process, the model parameter of the expression transfer model to be trained is updated with the goal of minimizing the discriminative loss value, the generative loss value, the classification loss value and the boundary loss value.

Further, this embodiment of the present disclosure provides an approach of determining the boundary loss value. In accordance with this approach, the fourth loss function is used to fit the boundary features of the synthesized facial image and the target domain facial image, so that the face in the synthesized facial image is closer in position to the face in the target domain facial image. This avoids occurrence of a large offset in face position or a large change in face size, thereby improving stability of facial synthesis.

In some embodiments, on the basis of each embodiment corresponding to FIG. 3, the training method for an expression transfer model provided by the present disclosure, the training method may further include the following steps:

obtaining, based on the target domain facial image and by a pixel segmentation model, a facial segmentation region.

The foregoing step 105 may include the following steps:

using, according to the facial segmentation region, the fifth loss function included in the target loss function, to obtain a target segmentation sub-loss value;

determining, when M segmentation sub-loss values are obtained, a segmentation loss value according to the M segmentation sub-loss values, the M segmentation sub-loss values including the target segmentation sub-loss value;

updating the model parameter of the expression transfer model to be trained by minimizing the discriminative loss value, the generative loss value, the classification loss value and the segmentation loss value, the discriminative loss value and the generative loss value being determined according to the first discrimination result and the second discrimination result, and the classification loss value being determined according to the category feature vector; and obtaining, when the model convergence condition is reached, the expression transfer model according to the updated model parameter.

In this embodiment, an approach of determining the segmentation loss value is described. The present disclosure describes the synthesis of one frame of facial image as an example. However, in practical applications, the number of images used for one iteration of training is more than one. Therefore, the following gives an example in which M images are used for one iteration of training.

Exemplarily, the present disclosure uses a pixel segmentation model to train the expression transfer model. The pixel segmentation model may use a U-shaped network (Unet), a fully convolutional network (FCN) or any other deep neural network, which is no limited herein. In order to maintain clarity of facial features and a face skin in the synthesized facial image, first, the pixel segmentation model may be used to segment the segmentation region of the facial features and the face skin from the target domain facial image. Then, pixels included in the synthesized facial image are compared with pixels included in the segmentation region, to obtain a first overlapping pixel region. In addition, pixels included in the target domain facial image are compared with pixels included in the segmentation region, to obtain a second overlapping pixel region. The fifth loss function is used to fit the first pixel region and the second pixel region, to make the two closer.

Specifically, it is assumed that the expression transfer model to be trained (or the expression transfer model) is expressed as $G(\cdot)$, an $i^{th}$ source domain facial image is expressed as $z^i$, an $i^{th}$ target domain facial image is expressed as $x^i$, an $i^{th}$ facial feature image is expressed as $l^i$, and an $i^{th}$ synthesized facial image is expressed as $G(z^i,l^i)$. Based on above, the target segmentation sub-loss value is calculated as follows:

$$LossMask^i = L1(G(z^i, l^i) \odot U, x^i \odot U);$$

where $LossMask^i$ represents the target segmentation sub-loss value, U represents the facial segmentation region, L1 represents calculation of the L1 loss between two features, $\odot$ represents an AND operation, $G(z^i,l^i) \odot U$ represents the first pixel region, and $x^i \odot U$ represents the second pixel region.

In a case that the M segmentation sub-loss values are obtained, the following fifth loss function is used to calculate the segmentation loss value:

$$LossMask = \frac{1}{M}\sum_{i=1}^{M}(L1(G(z^i, l^i) \odot U, x^i \odot U));$$

where LossMask represents the boundary loss value, and M represents a total number of images used for one iteration of training. During the training process, the model parameter of the expression transfer model to be trained is updated with the goal of minimizing the discriminative loss value, the generative loss value, the classification loss value and the segmentation loss value.

Further, this embodiment of the present disclosure provides an approach of determining the segmentation loss value. In accordance with this approach, the pixel segmentation model is used to obtain the facial features and the face skin of the synthesized facial image through segmentation, and obtain the facial features and the face skin of the target domain facial image through segmentation; and then, the fifth loss function is used to calculate a difference between the two segmented images, so as to reduce an influence caused by a lighting condition or facial occlusion to the image synthesis. This is conducive to generating a clearer and more realistic synthesized facial image, and avoids occurrence of discordant textures, such as color blocks, color spots, etc.

In some embodiments, the training method for an expression transfer model provided by the present disclosure, on the basis of each embodiment corresponding to FIG. 3, the foregoing step 105 may include the following steps:

using, according to the first discrimination result and the second discrimination result, a first loss function included in a target loss function, to determine a discriminative loss value and a generative loss value;

using, according to the category feature vector, a second loss function included in the target loss function, to determine a classification loss value;

using, according to a first identity feature corresponding to the synthesized facial image and a second identity feature corresponding to the target domain facial image, a third loss function included in the target loss function, to obtain an identity loss value;

using, according to a first boundary feature corresponding to the synthesized facial image and a second boundary feature corresponding to the target domain facial image, a fourth loss function included in the target loss function, to obtain a boundary loss value;

using, according to the synthesized facial image, the target domain facial image and a facial segmentation region corresponding to the target domain facial image, a fifth loss function included in the target loss function, to obtain a segmentation loss value;

updating the model parameter of the expression transfer model to be trained by minimizing the discriminative loss value, the generative loss value, the classification loss value, the identity loss value, the boundary loss value, and the segmentation loss value; and obtaining, when the model convergence condition is reached, the expression transfer model according to the updated model parameter.

This embodiment describes an approach of training the expression transfer model based on the loss functions of multiple perspectives. The foregoing embodiments describe the approaches of training the expression transfer model by using various types of loss functions. The training approaches involved in the present disclosure are listed below, referring to Table 1, which shows training based on the various types of loss functions.

diagram of training an expression transfer model according to an embodiment of the present disclosure. As shown in the figure, the source domain facial image and the facial feature image are together inputted to the expression transfer model to be trained, to allow this expression transfer model to output the synthesized facial image; the discriminative loss value, the generative loss value, the classification loss value, the identity loss value, the boundary loss value and the segmentation loss value are calculated, respectively, based on the synthesized facial image and the target domain facial image; the model parameter of the expression transfer model to be trained is updated according to these loss values; and the expression transfer model is obtained according to the updated model parameter, when the model convergence condition is reached.

This embodiment of the present disclosure provides an approach of training an expression transfer model based on the loss functions of multiple perspectives. In accordance with this approach, during the training process, the first loss function and the second loss function may be used to enhance the realism of the synthesized facial image; the third loss function may be used to maintain facial similarity and identity consistency; the fourth loss function may be used to maintain the features related to face shape, thereby improving the stability of facial synthesis; and the fifth loss function may be used to optimize the realism of the generated facial image, which helps to generate a clearer and more realistic synthesized facial image, and avoids the occurrence of discordant textures such as color blocks, color spots, etc. Based on above, the expression transfer model obtained through training not only outputs the synthesized facial image with high quality, but also performs training for the keypoints in the facial feature image, thereby permitting fine control of the expression.

TABLE 1

| Target loss function content | Loss value type |
| --- | --- |
| First loss function and second loss function | Discriminative loss value, generative loss value and classification loss value |
| First loss function, second loss function and third loss function | Discriminative loss value, generative loss value, classification loss value and identity loss value |
| First loss function, second loss function and fourth loss function | Discriminative loss value, generative loss value, classification loss value and boundary loss value |
| First loss function, second loss function and fifth loss function | Discriminative loss value, generative loss value, classification loss value and segmentation loss value |
| First loss function, second loss function, third loss function and fourth loss function | Discriminative loss value, generative loss value, classification loss value, identity loss value and boundary loss value |
| First loss function, second loss function, third loss function and fifth loss function | Discriminative loss value, generative loss value, classification loss value, identity loss value and segmentation loss value |
| First loss function, second loss function, fourth loss function and fifth loss function | Discriminative loss value, generative loss value, classification loss value, boundary loss value and segmentation loss value |
| First loss function, second loss function, third loss function, fourth loss function and fifth loss function | Discriminative loss value, generative loss value, classification loss value, identity loss value, boundary loss value and segmentation loss value |

Based on Table 1, a more comprehensive model can be obtained, when the first loss function, the second loss function, the third loss function, the fourth loss function and the fifth loss function are used to train the expression transfer model. For ease of understanding, FIG. 5 is a schematic In combination with the above description, the following describes an expression transfer method provided by the present disclosure. In this embodiment, synthetic processing may be performed on an image of a virtual object and a video material of a real person. Referring to FIG. 6, an embodiment of the expression transfer method provided by the present disclosure includes:

201. Obtain a first image corresponding to a virtual object and a video material corresponding to a real person. The video material includes P frames of second images, and P is an integer greater than or equal to 1.

In this embodiment, the terminal device obtains the first image corresponding to the virtual object. The virtual object includes, but is not limited to, a comic character, a game character, an animated character, etc. In addition, the terminal device also obtains the video material corresponding to the real person. The video material includes at least one frame of second image. The video material is an image material, when there is only one frame of second image.

202. Obtain a facial feature image set according to the video material. The facial feature image set includes P facial feature images, and the facial feature images are in a one-to-one correspondence with the second images.

In this embodiment, the terminal device obtains a facial feature image corresponding to each frame of second image in the video material. Each frame of facial feature image has extracted keypoints.

Specifically, according to an implementation, the terminal device locally extracts the keypoints from each frame of second image in the video material, and generates a corresponding facial feature image based on the extracted keypoints. According to another implementation, the terminal device transmits the video material to the server. On the side of the server, the video material is segmented into frames, the keypoints are extracted from each frame of second image, and a corresponding facial feature image is generated based on the extracted keypoints. Finally, the server feeds back the facial feature image set to the terminal device.

203. Obtain, based on the facial feature image set and the first image and by an expression transfer model, a synthesized facial video. The synthesized facial video includes P frames of synthesized facial images. The expression transfer model is trained based on the foregoing training method provided by each embodiment corresponding to FIG. 3.

In this embodiment, the terminal device obtains the synthesized facial images by the expression transfer model, to obtain the synthesized facial video.

Specifically, according to an implementation, the trained expression transfer model is stored on the side of the terminal device. In this case, the terminal device generates the synthesized facial video locally. According to another implementation, the trained expression transfer model is stored on the side of the server. In this case, the terminal device transmits the facial feature image set and the first image to the server. The server generates the synthesized facial video, and then feeds back the synthesized facial video to the terminal device.

204. Display the synthesized facial video.

In this embodiment, the terminal device displays the synthesized facial video, and may play the synthesized facial video. In the following, a case where the video material includes at least two frames of second images and a case where the video material includes one frame of second image are respectively described.

Figure 7:
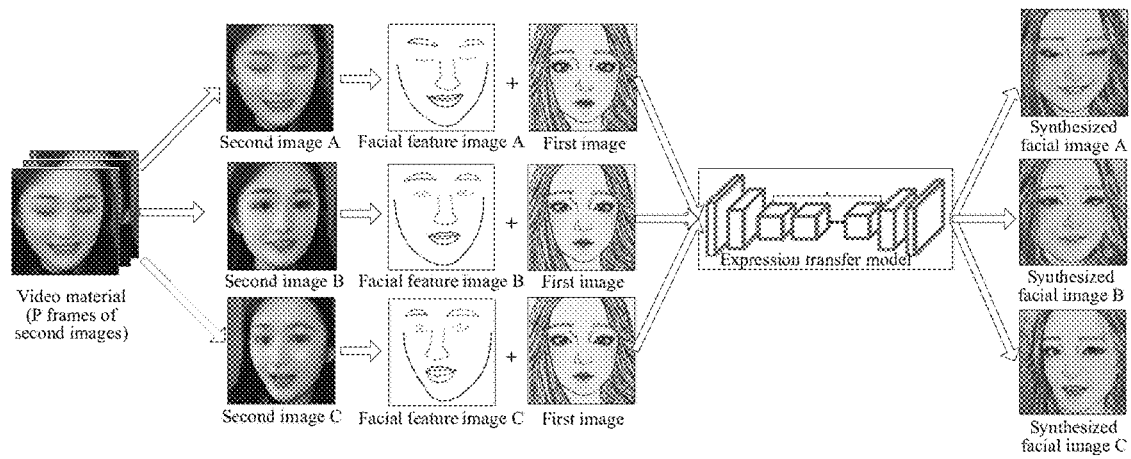
FIG. 7 is a schematic diagram of generating a synthesized facial video based on a multi-frame video material according to an embodiment of the present disclosure.

The first case is that P is greater than 1. For convenience of description, FIG. 7 is a schematic diagram of generating a synthesized facial video based on a multi-frame video material according to an embodiment of the present disclosure. As shown in the figure, it is assumed that P is 3, namely the video material including 3 frames of second images, respectively being a second image A, a second image B, and a second image C. The keypoints are extracted from the second image A, to obtain a facial feature image A; the keypoints are extracted from the second image B, to obtain a facial feature image B; and the keypoints are extracted from the second image C, to obtain a facial feature image C. Each facial feature image is stitched with the first image corresponding to the virtual object, to obtain a four-channel image. That is, the facial feature image A and the first image are stitched and then inputted into the trained expression transfer model, to allow the expression transfer model to output a synthesized facial image A. The facial feature image B and the first image are stitched and then inputted into the trained expression transfer model, to allow the expression transfer model to output a synthesized facial image B. The facial feature image C and the first image are stitched and then inputted into the trained expression transfer model, to allow the expression transfer model to output a synthesized facial image C. Finally, the synthesized facial video is generated based on the synthesized facial image A, the synthesized facial image B, and the synthesized facial image C.

Figure 8:
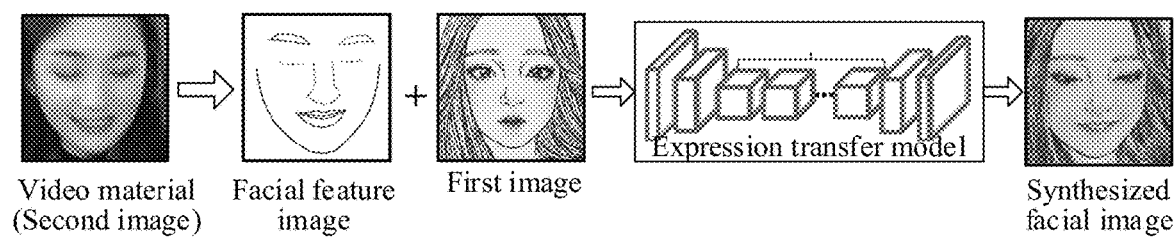
FIG. 8 is a schematic diagram of generating a synthesized facial video based on a single-frame video material according to an embodiment of the present disclosure.

The second case is that P is equal to 1. For convenience of description, FIG. 8 is a schematic diagram of generating a synthesized facial video based on a single-frame video material according to an embodiment of the present disclosure. It is assumed that P is 1, namely the video material including one frame of second image. The keypoints are extracted from the second image, to obtain a facial feature image. The facial feature image and the first image corresponding to the virtual object are stitched, to obtain a four-channel image. That is, the facial feature image and the first image are stitched and then inputted into the trained expression transfer model, to allow the expression transfer model to output the synthesized facial image. Finally, the synthesized facial video with only one frame of image is obtained based on the synthesized facial image.

This embodiment of the present disclosure provides the expression transfer method. First, the first image corresponding to the virtual object and the video material corresponding to the real person are obtained; the facial feature image set is obtained according to the video material; the synthesized facial video is obtained based on the facial feature image set and the first image and by the expression transfer model; and finally, the synthesized facial video is displayed on interface of the terminal device. In accordance with this method, the expression features (including eyeball positions and mouth shape changes, etc.) in the video material are maintained as much as possible during the expression transfer process. In addition, features related to the real person's face shape may also be maintained, so that the generated synthesized facial video or the synthesized facial image has a high consistency with the real human face.

In some embodiments, on the basis of each embodiment corresponding to FIG. 6, in an embodiment of the expression transfer method provided by the present disclosure, the operation of obtaining a first image corresponding to a virtual object and a video material corresponding to a real person may include the following steps:

obtaining, by an image acquisition apparatus, the first image corresponding to the virtual object, or obtaining the first image corresponding to the virtual object from a locally stored image set, the image set including an image corresponding to at least one virtual object; and obtaining, by the image acquisition apparatus, the video material corresponding to the real person, or obtaining the video material corresponding to the real person from a locally stored video set, the video set including a video corresponding to at least one real person.

This embodiment describes an approach of obtaining the first image and the video material. On the side of the terminal device, the image or the video may be directly captured, or may be uploaded.

Figure 9:
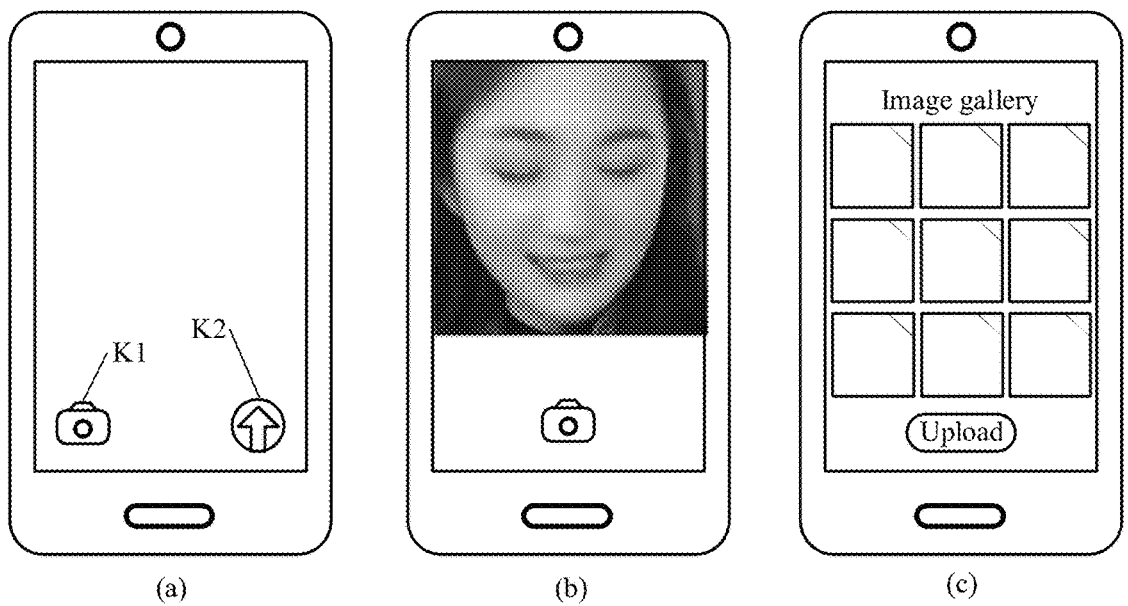
FIG. 9 is a schematic diagram of an interface for obtaining a first image and a video material according to an embodiment of the present disclosure.

Specifically, FIG. 9 is a schematic diagram of an interface for obtaining a first image and a video material according to an embodiment of the present disclosure. As shown in (a) of FIG. 9, the interface of the terminal device displays a "Capture" button K1 and an "Upload" button K2. In a case that a user triggers the "Capture" button K1, the interface shown in (b) of FIG. 9 is entered, and the image acquisition apparatus (e.g., an external camera or a built-in camera) of the terminal device is initiated. The image acquisition apparatus is used to capture the first image corresponding to the virtual object, or record the video material corresponding to the real person. In addition, the image acquisition apparatus may be used to record the video material corresponding to the virtual object, or capture the image corresponding to the real person. In a case that a user triggers the "Upload" button K2, the interface as shown in (C) of FIG. 9 is entered, and a photo album or an image library is entered. The locally stored image set (or video set) is displayed in the photo album or the image library. The user selects the first image corresponding to the virtual object or the image of the real person from the locally stored image set, and clicks the "Upload" button K3 after the selection; and select the video material corresponding to the real person or the video material corresponding to the virtual object from the locally stored video set, and clicks the "Upload" button K3 after the selection.

This embodiment of the present disclosure provides an approach of obtaining the first image and the video material. In accordance with this approach, a user may select to upload the first image or to capture the first image, and may select to upload the video material or to capture the video material. Thus, the user may select a corresponding synthesis object according to a requirement, thereby improving the flexibility and operability of the solution.

In some embodiments, on the basis of each embodiment corresponding to FIG. 6, the expression transfer method provided by the present disclosure, the operation of obtaining, based on the facial feature image set and the first image and by an expression transfer model, a synthesized facial video may include the following steps:
  obtaining, by the expression transfer model, a synthesized facial image corresponding to each facial feature image in the facial feature image set and the first image; and
  generating, when P synthesized facial images are obtained, a synthesized facial video.

Figure 10:
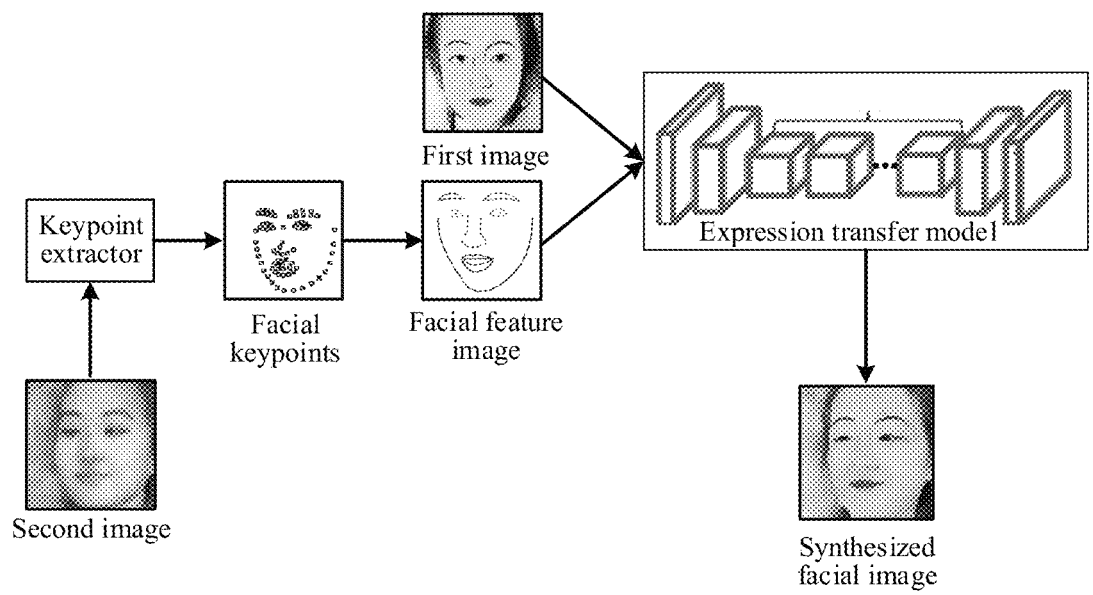
FIG. 10 is a schematic diagram of applying an expression transfer model according to an embodiment of the present disclosure.

This embodiment describes an approach of generating the synthesized facial video. The following description is made with reference to FIG. 10. FIG. 10 is a schematic diagram of applying an expression transfer model according to an embodiment of the present disclosure. As shown in the figure, any one frame of second image in the video material of the real person is used as an example. First, the second image is inputted to a keypoint extractor, to obtain facial keypoints; then, line connection processing is performed on these facial keypoints, to obtain the facial feature image. In addition, the first image of the virtual object is obtained. The first image and the facial feature image are inputted into the expression transfer model, to allow the expression transfer model to output the synthesized facial image. If there are P frames of second images, P frames of facial feature images are obtained. Finally, P frames of synthesized facial images are obtained, so as to generate the synthesized facial video.

Figure 11:
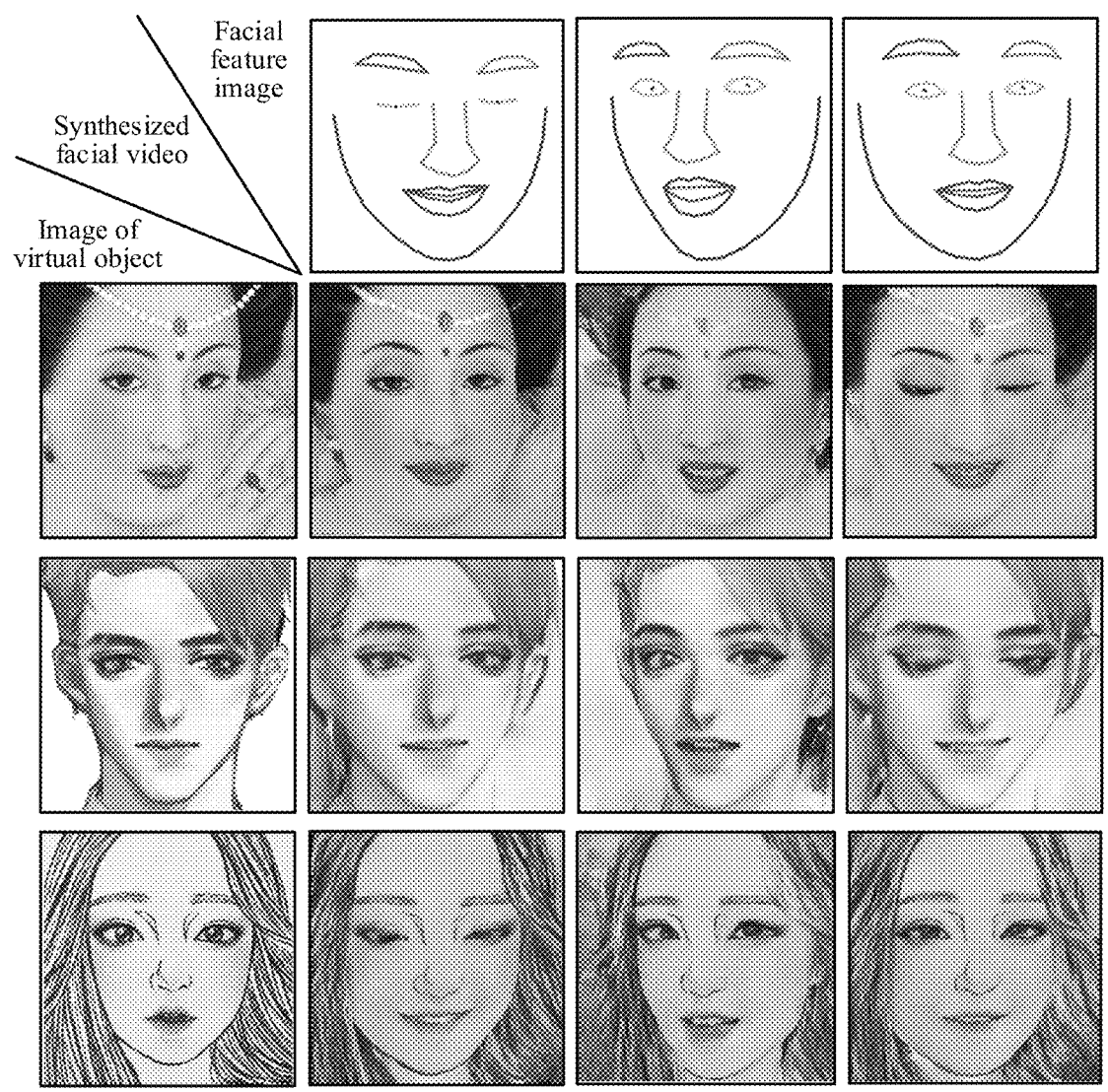
FIG. 11 is a schematic diagram of an effect of generating synthesized facial images according to an embodiment of the present disclosure.

In the following, a series of tests is performed based on the expression transfer method provided by the present disclosure. FIG. 11 is a schematic diagram of an effect of generating synthesized facial images according to an embodiment of the present disclosure. As shown in the figure, images in the first row are facial feature images obtained by extracting keypoints from real facial images, and images in the first column are images of virtual objects. The corresponding synthesized facial images are outputted by the expression transfer model. It can be seen that, images having similar expressions with real human faces can be obtained by using the expression transfer model provided by the present disclosure, which not only maintains the real facial features, but also fully integrates styles of the virtual objects, thereby obtaining more vivid synthesized images.

This embodiment of the present disclosure provides an approach of generating the synthesized facial video. In accordance with this approach, the synthesized facial images are outputted based on the expression transfer model, thereby improving feasibility and operability of the solution.

Figure 12:
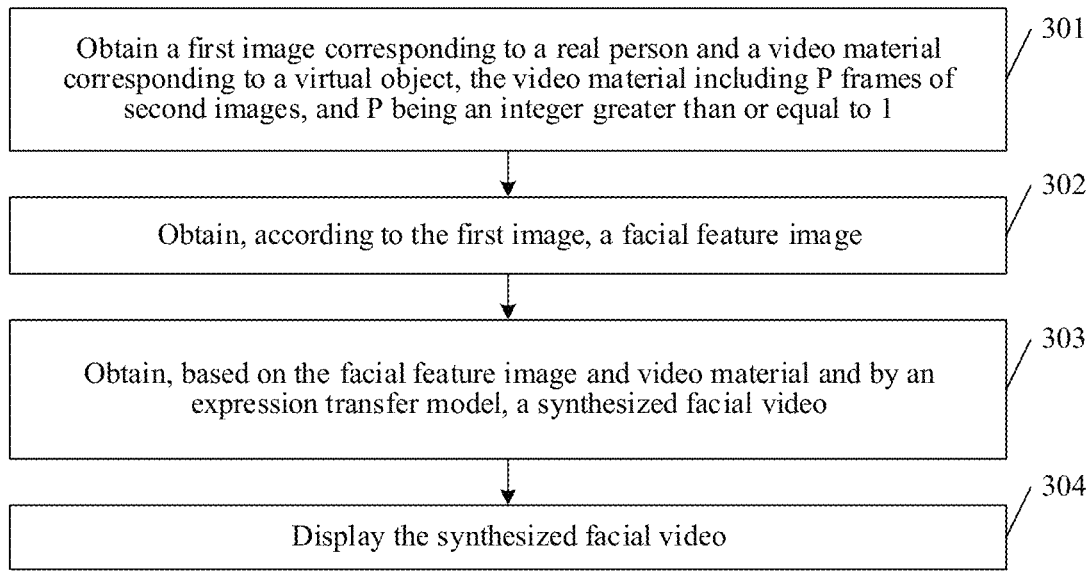
FIG. 12 is a schematic diagram of an expression transfer method according to another embodiment of the present disclosure.

In combination with the above description, the following describes an expression transfer method in the present disclosure. In this embodiment, synthetic processing may be performed on an image of a real person and a video material of a virtual object. Referring to FIG. 12, another embodiment of the expression transfer method provided by the present disclosure includes:

301. Obtain a first image corresponding to a real person and a video material corresponding to a virtual object. The video material includes P frames of second images, and P is an integer greater than or equal to 1.

In this embodiment, the terminal device obtains the first image corresponding to the real person. In addition, the terminal device also needs to obtain the video material corresponding to the virtual object. The virtual object includes, but is not limited to, a comic character, a game character, and an animated character, etc. The video material includes at least one frame of second image. The video material is an image material, when there is only one frame of second image.

302. Obtain, according to the first image, a facial feature image.

In this embodiment, the terminal device obtains the facial feature image corresponding to the first image.

Specifically, according to an implementation, the terminal device locally extracts the keypoints from the first image, and generates the corresponding facial feature image based on the extracted keypoints. According to another implementation, the terminal device transmits the first image to the server. On the side of the server, the keypoints are extracted from the first image, and the corresponding facial feature image is generated based on the extracted keypoints. Finally, the server feeds back the facial feature image to the terminal device.

303. Obtain, based on the facial feature image and the video material and by an expression transfer model, a synthesized facial video. The synthesized facial video includes P frames of synthesized facial images, and the expression transfer model is trained by using the training method according to any one of claims 1 to 7.

In this embodiment, the terminal device obtains the synthesized facial images by the expression transfer model, to obtain the synthesized facial video.

Specifically, according to an implementation, the trained expression transfer model is stored on the side of the terminal device. In this case, the terminal device generates the synthesized facial video locally. According to another implementation, the trained expression transfer model is stored on the side of the server. In this case, the terminal device transmits the facial feature image and the video material to the server, to allow the server to generate the synthesized facial video, and then feed back the synthesized facial video to the terminal device.

304. Display the synthesized facial video.

In this embodiment, the terminal device displays the synthesized facial video, and may play the synthesized facial video.

In the following, a case where the video material includes at least two frames of second images and a case where the video material includes one frame of second image are respectively described.

Figure 13:
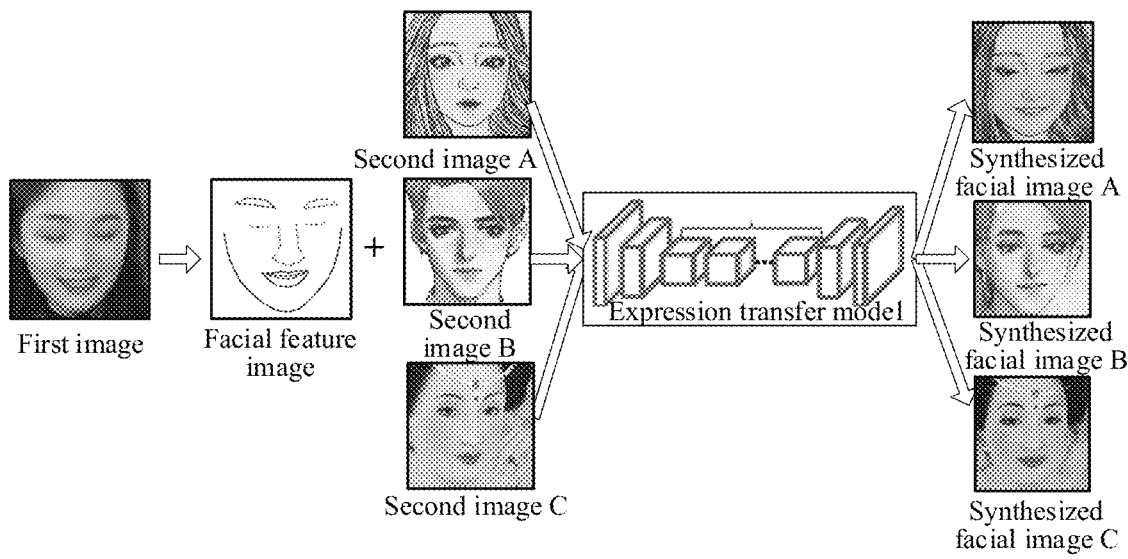
FIG. 13 is another schematic diagram of generating a synthesized facial video based on a multi-frame video material according to an embodiment of the present disclosure.

The first case is that P is greater than 1. For convenience of description, FIG. 13 is a schematic diagram of generating a synthesized facial video based on a multi-frame video material according to an embodiment of the present disclosure. As shown in the figure, it is assumed that P is 3, namely the video material including 3 frames of second images, respectively being a second image A, a second image B and a second image C. In addition, keypoints are extracted from the real facial image, namely the first image, to obtain the facial feature image. Each second image is stitched with the facial feature image corresponding to the real person, to obtain a four-channel image. That is, the second image A and the facial feature image are stitched and then inputted into the trained expression transfer model, to allow the expression transfer model to output a synthesized facial image A. The second image B and the facial feature image are stitched and then inputted into the trained expression transfer model, to allow the expression transfer model to output a synthesized facial image B. The second image C and the facial feature image are stitched and then inputted into the trained expression transfer model, to allow the expression transfer model to output a synthesized facial image C. Finally, the synthesized facial video is generated based on the synthesized facial image A, the synthesized facial image B, and the synthesized facial image C.

Figure 14:
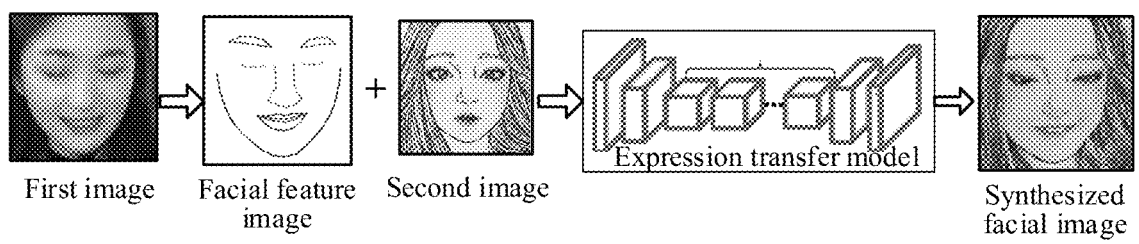
FIG. 14 is another schematic diagram of generating a synthesized facial video based on a single-frame video material according to an embodiment of the present disclosure.

The second case is that P is equal to 1. For convenience of description, FIG. 14 is a schematic diagram of generating a synthesized facial video based on a single-frame video material according to an embodiment of the present disclosure. It is assumed that P is 1, namely the video material including one frame of second image. In addition, the keypoints are extracted from the real facial image, namely the first image, to obtain the facial feature image. The facial feature image is stitched with the second image corresponding to the virtual object, to obtain a four-channel image. That is, the facial feature image and the second image are stitched and then inputted into the trained expression transfer model, to allow the expression transfer model to output the synthesized facial image. Finally, the synthesized facial video with only one frame of image is obtained based on the synthesized facial image.

This embodiment of the present disclosure provides the expression transfer method. First, the first image corresponding to the real person and the video material corresponding to the virtual object are obtained; the facial feature image is obtained according to the first image; the synthesized facial video is obtained based on the facial feature image and the video material and by the expression transfer model; and finally, the synthesized facial video is displayed. In accordance with this approach, the expression features (including eyeball positions and mouth shape changes, etc.) in the video material are maintained as much as possible during the expression transfer process. In addition, features related to the real person's face shape may also be maintained, so that the generated synthesized facial video or the synthesized facial image has a high consistency with the real human face.

In some embodiments, on the basis of each embodiment corresponding to FIG. 12, the expression transfer method provided by the present disclosure, the operation of obtaining, based on the facial feature image set and the first image and by the expression transfer model, a synthesized facial video may include the following steps:

obtaining, by the expression transfer model, a synthesized facial image corresponding to each frame of second image in the video material and the facial feature image; and generating, when P synthesized facial images are obtained, the synthesized facial video.

Figure 15:
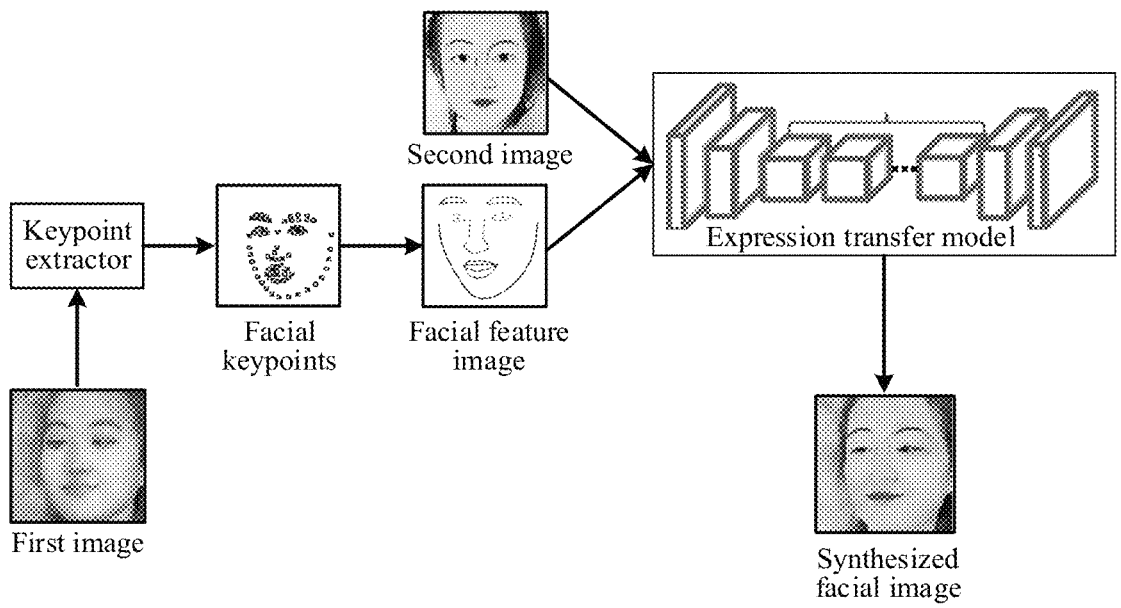
FIG. 15 is a schematic diagram of applying an expression transfer model according to another embodiment of the present disclosure.

This embodiment describes an approach of generating the synthesized facial video. The following description is made with reference to FIG. 15. FIG. 15 is a schematic diagram of applying an expression transfer model according to another embodiment of the present disclosure. As shown in the figure, any one frame of second image in the video material of the virtual object is used as an example. First, the first image of the real person is obtained, and the first image is inputted into a keypoint extractor, to obtain facial keypoints; then, line connection processing is performed on these facial keypoints, to obtain the facial feature image. The second image and the facial feature image are inputted into the expression transfer model, to allow the expression transfer model to output the synthesized facial image. If there are P frames of second images, P frames of facial feature images are obtained. Finally, P frames of synthesized facial images are obtained, so as to generate the synthesized facial video.

This embodiment of the present disclosure provides an approach of generating the synthesized facial video. In accordance with this approach, the synthesized facial images are outputted based on the expression transfer model, thereby improving feasibility and operability of the solution.

Figure 16:
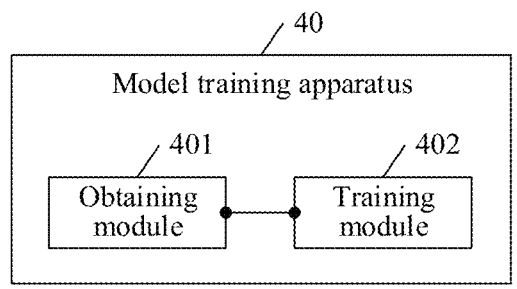
FIG. 16 is a schematic diagram of a model training device according to an embodiment of the present disclosure.

A model training device in the present disclosure is detailed below. FIG. 16 is a schematic diagram of a model training device according to an embodiment of the present disclosure. The model training device 40 includes:

an obtaining module 401, configured to obtain a source domain facial image of a first object, a target domain facial image of a second object and a facial feature image associated with the target domain facial image, the source domain facial image and the target domain facial image can be two images corresponding to a same object or two different objects (e.g., a virtual character and a real person), and the facial feature image being in a correspondence with the target domain facial image;

the obtaining module 401, further configured to obtain, based on the facial feature image and the source domain facial image and by an expression transfer model to be trained, a synthesized facial image;

the obtaining module 401, further configured to obtain, based on the synthesized facial image and the target domain facial image and by a discriminative network model, a first discrimination result corresponding to the synthesized facial image and a second discrimination result corresponding to the target domain facial image;

the obtaining module 401, further configured to obtain, based on the synthesized facial image and the target domain facial image and by an image classification model, a category feature vector; and a training module 402, configured to update, according to the category feature vector, the first discrimination result and the second discrimination result, a model parameter of the expression transfer model to be trained, to obtain the expression transfer model to reduce the difference between the synthesized facial image and the target domain facial image.

In some embodiments, on the basis of each embodiment corresponding to FIG. 16, in another embodiment of the model training device 40 provided by the present disclosure, the training module 402 is specifically configured to use, according to the first discrimination result and the second discrimination result, a first loss function included in a target loss function, to determine a discriminative loss value and a generative loss value;

use, according to the category feature vector, a second loss function included in the target loss function, to determine a classification loss value;

update the model parameter of the expression transfer model to be trained by minimizing the discriminative loss value, the generative loss value and the classification loss value; and obtain, when a model convergence condition is reached, the expression transfer model according to an updated model parameter.

In some embodiments, on the basis of each embodiment corresponding to FIG. 16, in another embodiment of the model training device 40 provided by the present disclosure, the training module 402 is specifically configured to use, according to the first discrimination result and the second discrimination result, a discriminative loss function included in the first loss function, to obtain a target discriminative sub-loss value;

determine, when M discriminative sub-loss values are obtained, the discriminative loss value according to the M discriminative sub-loss values, the M discriminative sub-loss values including the target discriminative sub-loss value, and M being an integer greater than or equal to 1;

use, according to the first discrimination result, a generative loss function included in the first loss function, to obtain a target generative sub-loss value; and determine, when M generative sub-loss values are obtained, the generative loss value according to the M generative sub-loss values, the M generative sub-loss values including the target generative sub-loss value.

In some embodiments, on the basis of each embodiment corresponding to FIG. 16, in another embodiment of the model training device 40 provided by the present disclosure, the obtaining module 401 is further configured to obtain, based on the synthesized facial image and by a face recognition model, a first identity feature; and the obtaining module 401 is further configured to obtain, based on the target domain facial image and by the face recognition model, a second identity feature; and the training module 402 is specifically configured to update, according to the category feature vector, the first discrimination result and the second discrimination result, a model parameter of the expression transfer model to be trained, including:

using, according to the first identity feature and the second identity feature, a third loss function included in the target loss function, to obtain a target identity sub-loss value;

determining, when M identity sub-loss values are obtained, an identity loss value according to the M identity sub-loss values, the M identity sub-loss values including the target identity sub-loss value;

updating the model parameter of the expression transfer model to be trained by minimizing the discriminative loss value, the generative loss value, the classification loss value and the identity loss value, the discriminative loss value and the generative loss value being determined according to the first discrimination result and the second discrimination result, and the classification loss value being determined according to the category feature vector; and obtaining, when the model convergence condition is reached, the expression transfer model according to an updated model parameter.

In some embodiments, on the basis of each embodiment corresponding to FIG. 16, in another embodiment of the model training device 40 provided by the present disclosure, the obtaining module 401 is further configured to obtain, based on the synthesized facial image, a first boundary feature by a boundary extraction model, the first boundary feature including a feature corresponding to facial boundary points in the synthesized facial image;

the obtaining module 401 is further configured to obtain, based on the target domain facial image, a second boundary feature by the boundary extraction model, the second boundary feature including a feature corresponding to facial boundary points in the target domain facial image; and the training module 402 is specifically configured to use, according to the first boundary feature and the second boundary feature, a fourth loss function included in the target loss function, to obtain a target boundary sub-loss value;

determine, when M boundary sub-loss values are obtained, a boundary loss value according to the M boundary sub-loss values, the M boundary sub-loss values including the target boundary sub-loss value;

update the model parameter of the expression transfer model to be trained by minimizing the discriminative loss value, the generative loss value, the classification loss value and the boundary loss value, the discriminative loss value and the generative loss value being determined according to the first discrimination result and the second discrimination result, and the classification loss value being determined according to the category feature vector; and obtain, when a model convergence condition is reached, the expression transfer model according to an updated model parameter.

In some embodiments, on the basis of each embodiment corresponding to FIG. 16, in another embodiment of the model training device 40 provided by the present disclosure, the obtaining module 401 is further configured to obtain, based on the target domain facial image, a facial segmentation region by a pixel segmentation model; and the training module 402 is specifically configured to use, according to the facial segmentation region, a fifth loss function included in the target loss function, to obtain a target segmentation sub-loss value;

determine, when M segmentation sub-loss values are obtained, a segmentation loss value according to the M segmentation sub-loss values, the M segmentation sub-loss values including the target segmentation sub-loss value;

update the model parameter of the expression transfer model to be trained by minimizing the discriminative loss value, the generative loss value, the classification loss value and the segmentation loss value, the discriminative loss value and the generative loss value being determined according to the first discrimination result and the second discrimination result, and the classification loss value being determined according to the category feature vector; and obtain, when a model convergence condition is reached, the expression transfer model according to an updated model parameter.

In some embodiments, on the basis of each embodiment corresponding to FIG. 16, in another embodiment of the model training device 40 provided by the present disclosure, the training module 402 is specifically configured to use, according to the first discrimination result and the second discrimination result, a first loss function included in a target loss function, to determine a discriminative loss value and a generative loss value;

use, according to the category feature vector, a second loss function included in the target loss function, to determine a classification loss value;

use, according to a first identity feature corresponding to the synthesized facial image and a second identity feature corresponding to the target domain facial image, a third loss function included in the target loss function, to obtain an identity loss value;

use, according to a first boundary feature corresponding to the synthesized facial image and a second boundary feature corresponding to the target domain facial image, a fourth loss function included in the target loss function, to obtain a boundary loss value;

use, according to the synthesized facial image, the target domain facial image and a facial segmentation region corresponding to the target domain facial image, a fifth loss function included in the target loss function, to obtain a segmentation loss value;

update the model parameter of the expression transfer model to be trained by minimizing the discriminative loss value, the generative loss value, the classification loss value, the identity loss value, the boundary loss value and the segmentation loss value; and obtain, when a model convergence condition is reached, the expression transfer model according to an updated model parameter.

Figure 17:
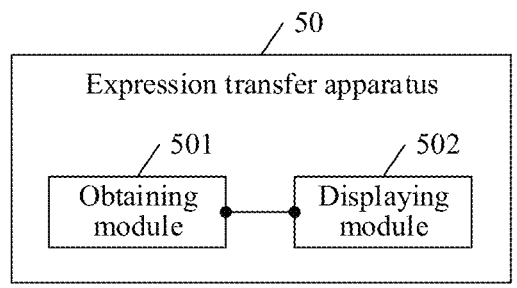
FIG. 17 is a schematic diagram of an expression transfer apparatus according to an embodiment of the present disclosure.

An expression transfer apparatus in the present disclosure is detailed below. FIG. 17 is a schematic diagram of an expression transfer apparatus according to an embodiment of the present disclosure. The expression transfer apparatus 50 includes:

an obtaining module 501, configured to obtain a first image corresponding to a virtual object and a video material corresponding to a real person, the video material including P frames of second images, and P being an integer greater than or equal to 1;

the obtaining module 501, further configured to obtain, according to the video material, a facial feature image set, the facial feature image set including P facial feature images, and the facial feature images being in a one-to-one correspondence with the second images;

the obtaining module 501, further configured to obtain, based on the facial feature image set and the first image and by an expression transfer model, a synthesized facial video, the synthesized facial video including P frames of synthesized facial images, and the expression transfer model being trained by using the training method according to any one of the foregoing aspects; and a displaying module 502, configured to display the synthesized facial video.

In some embodiments, on the basis of each embodiment corresponding to FIG. 17, in another embodiment of the expression transfer apparatus 50 provided by the present disclosure, the obtaining module 501 is specifically configured to obtain, by an image acquisition apparatus, the first image corresponding to the virtual object, or obtain the first image corresponding to the virtual object from an image set locally stored in the terminal device, the image set including an image corresponding to at least one virtual object; and obtain, by the image acquisition apparatus, the video material corresponding to the real person, or obtain the video material corresponding to the real person from a video set locally stored in the terminal device, the video set including a video corresponding to at least one real person.

In some embodiments, on the basis of each embodiment corresponding to FIG. 17, in another embodiment of the expression transfer apparatus 50 provided by the present disclosure, the obtaining module 501 is specifically configured to obtain, by the expression transfer model, a synthesized facial image corresponding to each facial feature image in the facial feature image set and the first image by the expression transfer model; and generate, when P synthesized facial images are obtained, the synthesized facial video.

Figure 18:
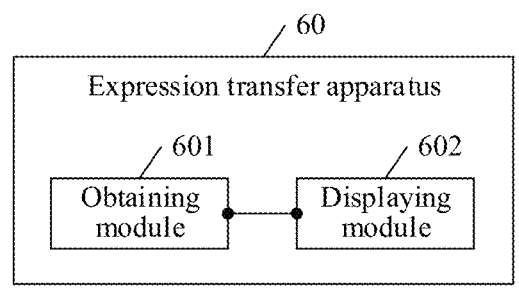
FIG. 18 is a schematic diagram of an expression transfer apparatus according to another embodiment of the present disclosure.

An expression transfer apparatus in the present disclosure is detailed below. FIG. 18 is a schematic diagram of an expression transfer apparatus according to an embodiment of the present disclosure. The expression transfer apparatus 60 includes:

an obtaining module 601, configured to obtain a first image corresponding to a real person and a video material corresponding to a virtual object, the video material including P frames of second images, and P being an integer greater than or equal to 1;

the obtaining module 601, further configured to obtain, according to the first image, a facial feature image;

the obtaining module 601, further configured to obtain, based on the facial feature image and the video material and by an expression transfer model, a synthesized facial video, the synthesized facial video including P frames of synthesized facial images, and the expression transfer model being trained by using the training method according to any one of the foregoing aspects; and a displaying module 602, further configured to display the synthesized facial video.

In some embodiments, on the basis of each embodiment corresponding to FIG. 18, in another embodiment of the expression transfer apparatus 60 provided by the present disclosure, the obtaining module 601 is specifically configured to obtain, by the expression transfer model, a synthesized facial image corresponding to each frame of second image in the video material and the facial feature image; and generate, when P synthesized facial images are obtained, the synthesized facial video.

Figure 19:
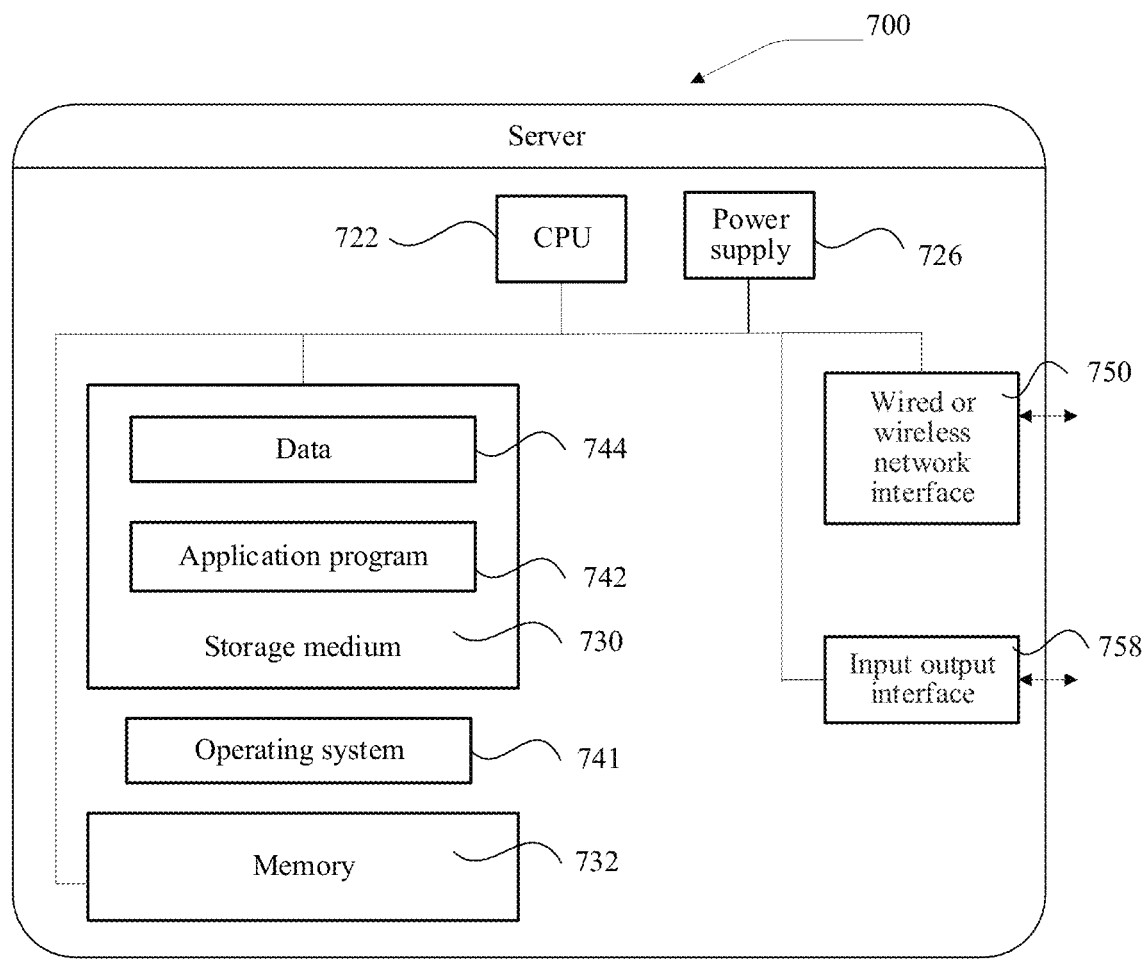
FIG. 19 is a schematic structural diagram of a server according to an embodiment of the present disclosure.

The model training device provided by the present disclosure may be deployed on the server, and the expression transfer apparatus provided by the present disclosure may also be deployed on the server. That is, the computer device in the present disclosure may be the server. FIG. 19 is a schematic structural diagram of a server according to an embodiment of the present disclosure. The server 700 may vary greatly due to different configurations or performance, and may include one or more central processing units (CPU) 722 (for example, one or more processors) and a memory 732, and one or more storage media 730 (for example, one or more mass storage devices) that store applications 742 or data 744. The memory 732 and the storage medium 730 may be transient storage or persistent storage. The program stored in the storage medium 730 may include one or more modules (not marked in the figure), and each module may include a series of instruction operations to the server. Still further, the CPU 722 may be configured to communicate with the storage medium 730 to perform the series of instruction operations in the storage medium 730 on the server 700.

The server 700 may further include one or more power supplies 726, one or more wired or wireless network interfaces 750, one or more input/output interfaces 758, and/or one or more operating systems 741, for example, Windows Server™, Mac OS X™, Unix™, Linux™, or FreeBSD™.

The steps performed by the server in the foregoing embodiment may be based on the structure of the server shown in FIG. 19.

Figure 20:
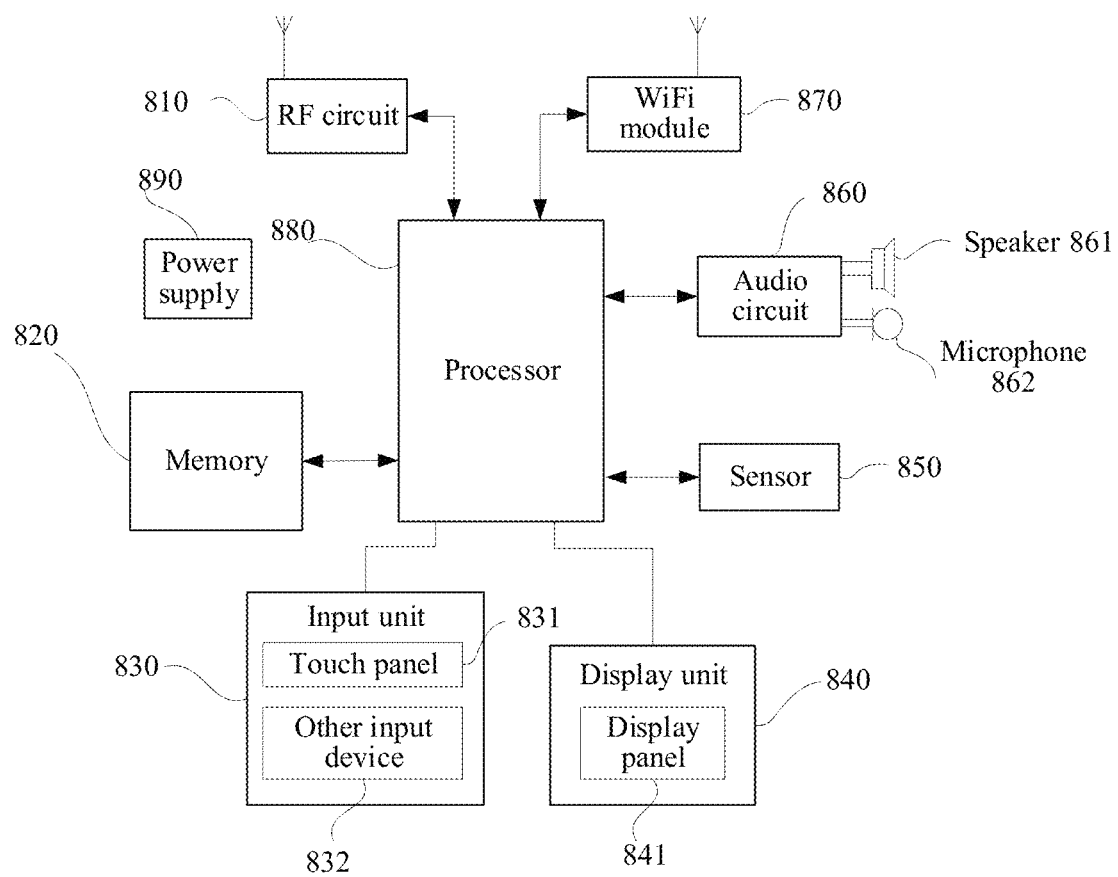
FIG. 20 is a schematic structural diagram of a terminal device according to an embodiment of the present disclosure.

The model training device provided by the present disclosure may be deployed on the terminal device, and the expression transfer apparatus provided by the present disclosure may also be deployed on the terminal device. That is, the computer device in the present disclosure may be the terminal device. As shown in FIG. 20, for ease of description, only parts related to the embodiments of the present disclosure are shown. For specific technical details that are not disclosed, refer to the method part in the embodiments of the present disclosure. The terminal device may be any terminal device including a mobile phone, a tablet computer, a personal digital assistant (PDA), a point of sales (POS), and an on-board computer, and the terminal device being a mobile phone is used as an example.

FIG. 20 is a block diagram of a partial structure of a mobile phone related to a terminal device according to an embodiment of the present disclosure. Referring to FIG. 20, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. A person skilled in the art can understand that the structure of the mobile phone shown in FIG. 20 does not constitute a limitation to the mobile phone, and the mobile phone may include more components or fewer components than those shown in the figure, or some components may be combined, or a different component deployment may be used.

The following makes a detailed description of the components of the mobile phone with reference to FIG. 20.

The RF circuit 810 may be configured to receive and send a signal in an information receiving and sending process or a call process, and in particular, after downlink information of a base station is received, send the downlink information to the processor 880 for processing. In addition, the RF circuit transmits uplink data to the base station. Usually, the RF circuit 810 includes, but is not limited to, an antenna, at least one amplifier, a transceiver, a coupler, a low noise amplifier (LNA), and a duplexer. In addition, the RF circuit 810 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and a module. The processor 880 runs the software program and the module that are stored in the memory 820, to implement various functional applications and data processing of the mobile phone. The memory 820 may mainly include a program storage area and a data storage area. The program storage area may store an operating system, an application program required by at least one function (for example, a sound playing function and an image playing function), or the like. The data storage area may store data (for example, audio data and a phone book) created according to use of the mobile phone. In addition, the memory 820 may include a high speed random access memory, and may further include a non-volatile memory, such as at least one magnetic disk storage device, a flash memory, or another volatile solid storage device.

The input unit 830 may be configured to receive inputted digit or character information, and generate a keyboard signal input related to the user setting and function control of the mobile phone. Specifically, the input unit 830 may include a touch panel 831 and another input device 832. The touch panel 831, also referred to as a touchscreen, may collect a touch operation of a user on or near the touch panel (such as an operation of a user on or near the touch panel 831 by using any suitable object or accessory such as a finger or a stylus), and drive a corresponding connection apparatus according to a preset program. In some embodiments, the touch panel 831 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 880, and can receive and execute a command sent by the processor 880. In addition, the touch panel 831 may be implemented by using various types, such as a resistive type, a capacitive type, an infrared type, and a surface acoustic wave type. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information inputted by the user or information provided for the user, and various menus of the mobile phone. The display unit 840 may include a display panel 841. In some embodiments, the display panel 841 may be configured by using a liquid crystal display (LCD), an organic light-emitting diode (OLED), or the like. Further, the touch panel 831 may cover the display panel 841. After detecting a touch operation on or near the touch panel, the touch panel 831 transfers the touch operation to the processor 880, to determine a type of a touch event. Then, the processor 880 provides a corresponding visual output on the display panel 841 according to the type of the touch event. Although in FIG. 20, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850 such as an optical sensor, a motion sensor, and other sensors. Specifically, the optical sensor may include an ambient light sensor and a proximity sensor, where the ambient light sensor may adjust luminance of the display panel 841 according to the luminance of the ambient light, and the proximity sensor may switch off the display panel 841 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 860, a speaker 861, and a microphone 862 may provide audio interfaces between the user and the mobile phone. The audio circuit 860 may transmit, to the loudspeaker 861, an electrical signal obtained by converting received audio data, and the loudspeaker 861 converts the electrical signal into a voice signal for outputting. In addition, the microphone 862 converts a collected sound signal into an electrical signal. After receiving the electrical signal, the audio circuit 860 converts the electrical signal into audio data, and then outputs the audio data. After being processed by the processor 880, the audio data is transmitted through the RF circuit 810 to, for example, another mobile phone or the audio data is outputted to the memory 820 for further processing.

Wi-Fi is a short distance wireless transmission technology. The mobile phone may help, by using the Wi-Fi module 870, a user to receive and transmit an email, browse a web page, access stream media, and the like. This provides wireless broadband Internet access for the user. Although FIG. 20 shows the Wi-Fi module 870, it may be understood that the Wi-Fi module is not a necessary component of the mobile phone, and the Wi-Fi module may be omitted as required provided that the scope of the essence of the present disclosure is not changed.

The processor 880 is a control center of the mobile phone, and is connected to various parts of the entire mobile phone by using various interfaces and lines. By running or executing the software program and/or the module stored in the memory 820, and invoking data stored in the memory 820, the processor executes various functions of the mobile phone and performs data processing, thereby monitoring the entire mobile phone. In some embodiments, the processor 880 may include one or more processing units. In some embodiments, the processor 880 may integrate an application processor and a modem processor. The application processor mainly processes an operating system, a user interface, an application program, and the like. The modem processor mainly processes wireless communication. It may be understood that the foregoing modem may either not be integrated into the processor 880.

The mobile phone further includes the power supply 890 (such as a battery) for supplying power to the components. In some embodiments, the power supply may be logically connected to the processor 880 by using a power management system, thereby implementing functions such as charging, discharging, and power consumption management by using the power management system.

Although not shown in the figure, the mobile phone may further include a camera, a Bluetooth module, and the like, which are not further described herein.

The steps performed by the terminal device in the foregoing embodiments may be based on the structure of the terminal device shown in FIG. 20.

An embodiment of the present disclosure further provides a computer-readable storage medium, storing a computer program. The computer program, when executed on a computer, causing the computer to perform the steps in the method according to any one of the foregoing embodiments.

An embodiment of the present disclosure further provides a computer program product including an instruction, when being executed on a computer, causing the computer to perform the steps in the method according to any one of the foregoing embodiments.

A person skilled in the art can clearly understand that for convenience and conciseness of description, for specific working processes of the foregoing described system, apparatus and unit, refer to the corresponding processes in the foregoing method embodiments, and details are not described herein.

In the several embodiments provided in the present disclosure, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (read-only memory, ROM), a random access memory (random access memory, RAM), a magnetic disk or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for training an expression transfer model, performed by a computer device, and the method comprising:
    obtaining a source domain facial image of a first object, a target domain facial image of a second object and a facial feature image associated with the target domain facial image, the second object being different from the first object;
    obtaining, based on applying the facial feature image and the source domain facial image to an expression transfer model, a synthesized facial image of the first object simulating the facial feature image associated with the target domain facial image;
    obtaining, based on applying the synthesized facial image of the first object and the target domain facial image of the second object to a discriminative network model, (i) a first determination result corresponding to the synthesized facial image and the source domain facial image and (ii) a second determination result corresponding to the target domain facial image;
    obtaining a discriminative loss function based on the first determination result and the second determination result and a generative loss function based on the first determination result, respectively;
    obtaining, based on applying the synthesized facial image of the first object and the target domain facial image of the second object to an image classification model, a category feature vector, the category feature vector being configured for identifying a difference between the synthesized facial image and the target domain facial image;
    applying the synthesized facial image and the target domain facial image to a face recognition model to obtain a first identity feature and a second identity feature, respectively;
    obtaining a target identity sub-loss value according to the first identity feature and the second identity feature;
    determining, when M identity sub-loss values are obtained, an identity loss value according to an average of the M identity sub-loss values, the M identity sub-loss values comprising the target identity sub-loss value, M being an integer greater than or equal to 1; and
    updating, according to the identity loss value, the category feature vector, the discriminative loss function and the generative loss function, the expression transfer model to reduce the difference between the synthesized facial image and the target domain facial image.

2. The method according to claim 1, wherein the updating, according to the identity loss value, the category feature vector, the discriminative loss function and the generative loss function, the expression transfer model to reduce the difference between the synthesized facial image and the target domain facial image comprises:
    using, according to the discriminative loss function and the generative loss function, to determine a discriminative loss value and a generative loss value;
    using, according to the category feature vector, to determine a classification loss value; and
    updating the expression transfer model by minimizing the identity loss value, the discriminative loss value, the generative loss value and the classification loss value until a model convergence condition is reached.

3. The method according to claim 2, wherein the using, according to the discriminative loss function and the generative loss function, to determine a discriminative loss value and a generative loss value comprises:
    using, according to the discriminative loss function and the generative loss function, to obtain a target discriminative sub-loss value;
    determining, when M discriminative sub-loss values are obtained, the discriminative loss value according to an average of the M discriminative sub-loss values, the M discriminative sub-loss values comprising the target discriminative sub-loss value, and M being an integer greater than or equal to 1;
    using, according to the generative loss function, to obtain a target generative sub-loss value; and
    determining, when M generative sub-loss values are obtained, the generative loss value according to an average of the M generative sub-loss values, the M generative sub-loss values comprising the target generative sub-loss value.

4. The method according to claim 1, further comprising:
    obtaining, based on applying the synthesized facial image to a boundary extraction model, a first boundary feature, the first boundary feature comprising a feature corresponding to facial boundary points in the synthesized facial image;
    obtaining, based on applying the target domain facial image to the boundary extraction model, a second boundary feature, the second boundary feature comprising a feature corresponding to facial boundary points in the target domain facial image; and
    using, according to the first boundary feature and the second boundary feature, to obtain a target boundary sub-loss value;
    determining, when M boundary sub-loss values are obtained, a boundary loss value according to an average of the M boundary sub-loss values, the M boundary sub-loss values comprising the target boundary sub-loss value; and updating the expression transfer model by minimizing the identity loss value, the discriminative loss value, the generative loss value, the classification loss value and the boundary loss value until the model convergence condition is reached, the discriminative loss value and the generative loss value being determined according to the discriminative loss function and the generative loss function, and the classification loss value being determined according to the category feature vector.

5. The method according to claim 1, further comprising:

obtaining, based on applying the target domain facial image to a pixel segmentation model, a facial segmentation region; and using, according to the facial segmentation region, to obtain a target segmentation sub-loss value;

determining, when M segmentation sub-loss values are obtained, a segmentation loss value according to an average of the M segmentation sub-loss values, the M segmentation sub-loss values comprising the target segmentation sub-loss value; and updating the expression transfer model by minimizing the identity loss value, the discriminative loss value, the generative loss value, the classification loss value and the segmentation loss value, the discriminative loss value and the generative loss value being determined according to the discriminative loss function and the generative loss function, and the classification loss value being determined according to the category feature vector; and obtaining, when the model convergence condition is reached, the expression transfer model according to an updated model parameter.

6. The method according to claim 1, wherein the updating, according to the identity loss value, the category feature vector, the discriminative loss function and the generative loss function, the expression transfer model to reduce the difference between the synthesized facial image and the target domain facial image comprises:

using, according to the discriminative loss function and the generative loss function, to determine a discriminative loss value and a generative loss value;

using, according to the category feature vector, to determine a classification loss value;

using, according to a first boundary feature corresponding to the synthesized facial image and a second boundary feature corresponding to the target domain facial image, to obtain a boundary loss value;

using, according to the synthesized facial image, the target domain facial image and a facial segmentation region corresponding to the target domain facial image, to obtain a segmentation loss value; and updating the expression transfer model by minimizing the identity loss value, the discriminative loss value, the generative loss value, the classification loss value, the boundary loss value and the segmentation loss value until the model convergence condition is reached.

7. A computer device, comprising: a memory, a processor, and a bus system, the bus system connecting the memory to the processor;

the memory being configured to store a plurality of computer programs;

the processor being configured to execute the plurality of computer programs to perform a method for training an expression transfer model including:

obtaining a source domain facial image of a first object, a target domain facial image of a second object and a facial feature image associated with the target domain facial image, the second object being different from the first object;

obtaining, based on applying the facial feature image and the source domain facial image to an expression transfer model, a synthesized facial image of the first object simulating the facial feature image associated with the target domain facial image;

obtaining, based on applying the synthesized facial image of the first object and the target domain facial image of the second object to a discriminative network model, (i) a first determination result corresponding to the synthesized facial image and the source domain facial image and (ii) a second determination result corresponding to the target domain facial image;

obtaining a discriminative loss function based on the first determination result and the second determination result and a generative loss function based on the first determination result, respectively;

obtaining, based on applying the synthesized facial image of the first object and the target domain facial image of the second object to an image classification model, a category feature vector, the category feature vector being configured for identifying a difference between the synthesized facial image and the target domain facial image;

applying the synthesized facial image and the target domain facial image to a face recognition model to obtain a first identity feature and a second identity feature, respectively;

obtaining a target identity sub-loss value according to the first identity feature and the second identity feature;

determining, when M identity sub-loss values are obtained, an identity loss value according to an average of the M identity sub-loss values, the M identity sub-loss values comprising the target identity sub-loss value, M being an integer greater than or equal to 1; and updating, according to the identity loss value, the category feature vector, the discriminative loss function and the generative loss function, the expression transfer model to reduce the difference between the synthesized facial image and the target domain facial image.

8. The computer device according to claim 7, wherein the updating, according to the identity loss value, the category feature vector, the discriminative loss function and the generative loss function, the expression transfer model to reduce the difference between the synthesized facial image and the target domain facial image comprises:

using, according to the discriminative loss function and the generative loss function, to determine a discriminative loss value and a generative loss value;

using, according to the category feature vector, to determine a classification loss value; and updating the expression transfer model by minimizing the identity loss value, the discriminative loss value, the generative loss value and the classification loss value until a model convergence condition is reached.

9. The computer device according to claim 8, wherein the using, according to the discriminative loss function and the generative loss function, to determine a discriminative loss value and a generative loss value comprises:

using, according to the discriminative loss function and the generative loss function, to obtain a target discriminative sub-loss value;

determining, when M discriminative sub-loss values are obtained, the discriminative loss value according to an average of the M discriminative sub-loss values, the M discriminative sub-loss values comprising the target discriminative sub-loss value, and M being an integer greater than or equal to 1;

using, according to the generative loss function, to obtain a target generative sub-loss value; and determining, when M generative sub-loss values are obtained, the generative loss value according to an average of the M generative sub-loss values, the M generative sub-loss values comprising the target generative sub-loss value.

10. The computer device according to claim 7, wherein the method further comprises:

obtaining, based on applying the synthesized facial image to a boundary extraction model, a first boundary feature, the first boundary feature comprising a feature corresponding to facial boundary points in the synthesized facial image;

obtaining, based on applying the target domain facial image to the boundary extraction model, a second boundary feature, the second boundary feature comprising a feature corresponding to facial boundary points in the target domain facial image; and using, according to the first boundary feature and the second boundary feature, to obtain a target boundary sub-loss value;

determining, when M boundary sub-loss values are obtained, a boundary loss value according to an average of the M boundary sub-loss values, the M boundary sub-loss values comprising the target boundary sub-loss value; and updating the expression transfer model by minimizing the identity loss value, the discriminative loss value, the generative loss value, the classification loss value and the boundary loss value until the model convergence condition is reached, the discriminative loss value and the generative loss value being determined according to the discriminative loss function and the generative loss function, and the classification loss value being determined according to the category feature vector.

11. The computer device according to claim 7, wherein the method further comprises:

obtaining, based on applying the target domain facial image to a pixel segmentation model, a facial segmentation region; and using, according to the facial segmentation region, to obtain a target segmentation sub-loss value;

determining, when M segmentation sub-loss values are obtained, a segmentation loss value according to an average of the M segmentation sub-loss values, the M segmentation sub-loss values comprising the target segmentation sub-loss value; and updating the expression transfer model by minimizing the identity loss value, the discriminative loss value, the generative loss value, the classification loss value and the segmentation loss value, the discriminative loss value and the generative loss value being determined according to the discriminative loss function and the generative loss function, and the classification loss value being determined according to the category feature vector; and obtaining, when the model convergence condition is reached, the expression transfer model according to an updated model parameter.

12. The computer device according to claim 7, wherein the updating, according to the identity loss value, the category feature vector, the discriminative loss function and the generative loss function, the expression transfer model to reduce the difference between the synthesized facial image and the target domain facial image comprises:

using, according to the discriminative loss function and the generative loss function, to determine a discriminative loss value and a generative loss value;

using, according to the category feature vector, to determine a classification loss value;

using, according to a first boundary feature corresponding to the synthesized facial image and a second boundary feature corresponding to the target domain facial image, to obtain a boundary loss value;

using, according to the synthesized facial image, the target domain facial image and a facial segmentation region corresponding to the target domain facial image, to obtain a segmentation loss value; and updating the expression transfer model by minimizing the identity loss value, the discriminative loss value, the generative loss value, the classification loss value, the boundary loss value and the segmentation loss value until the model convergence condition is reached.

13. A non-transitory computer readable storage medium, storing a plurality of computer programs, the plurality of computer programs, when executed by a processor of a computer device, causing the computer device to perform a method for training an expression transfer model including:

obtaining a source domain facial image of a first object, a target domain facial image of a second object and a facial feature image associated with the target domain facial image, the second object being different from the first object;

obtaining, based on applying the facial feature image and the source domain facial image to an expression transfer model, a synthesized facial image of the first object simulating the facial feature image associated with the target domain facial image;

obtaining, based on applying the synthesized facial image of the first object and the target domain facial image of the second object to a discriminative network model, (i) a first determination result corresponding to the synthesized facial image and the source domain facial image and (ii) a second determination result corresponding to the target domain facial image;

obtaining a discriminative loss function based on the first determination result and the second determination result and a generative loss function based on the first determination result, respectively;

obtaining, based on applying the synthesized facial image of the first object and the target domain facial image of the second object to an image classification model, a category feature vector, the category feature vector being configured for identifying a difference between the synthesized facial image and the target domain facial image;

applying the synthesized facial image and the target domain facial image to a face recognition model to obtain a first identity feature and a second identity feature, respectively;

obtaining a target identity sub-loss value according to the first identity feature and the second identity feature;

determining, when M identity sub-loss values are obtained, an identity loss value according to an average of the M identity sub-loss values, the M identity sub-loss values comprising the target identity sub-loss value, M being an integer greater than or equal to 1; and updating, according to the identity loss value, the category feature vector, the discriminative loss function and the generative loss function, the expression transfer model to reduce the difference between the synthesized facial image and the target domain facial image.

14. The non-transitory computer readable storage medium according to claim 13, wherein the updating, according to the identity loss value, the category feature vector, the discriminative loss function and the generative loss function, the expression transfer model to reduce the difference between the synthesized facial image and the target domain facial image comprises:

using, according to the discriminative loss function and the generative loss function, to determine a discriminative loss value and a generative loss value;

using, according to the category feature vector, to determine a classification loss value; and updating the expression transfer model by minimizing the identity loss value, the discriminative loss value, the generative loss value and the classification loss value until a model convergence condition is reached.

15. The non-transitory computer readable storage medium according to claim 13, wherein the method further comprises:

obtaining, based on applying the synthesized facial image to a boundary extraction model, a first boundary feature, the first boundary feature comprising a feature corresponding to facial boundary points in the synthesized facial image;

obtaining, based on applying the target domain facial image to the boundary extraction model, a second boundary feature, the second boundary feature comprising a feature corresponding to facial boundary points in the target domain facial image; and using, according to the first boundary feature and the second boundary feature, to obtain a target boundary sub-loss value;

determining, when M boundary sub-loss values are obtained, a boundary loss value according to an average of the M boundary sub-loss values, the M boundary sub-loss values comprising the target boundary sub-loss value; and updating the expression transfer model by minimizing the identity loss value, the discriminative loss value, the generative loss value, the classification loss value and the boundary loss value until the model convergence condition is reached, the discriminative loss value and the generative loss value being determined according to the discriminative loss function and the generative loss function, and the classification loss value being determined according to the category feature vector.

16. The non-transitory computer readable storage medium according to claim 13, wherein the method further comprises:

obtaining, based on applying the target domain facial image to a pixel segmentation model, a facial segmentation region; and using, according to the facial segmentation region, to obtain a target segmentation sub-loss value;

determining, when M segmentation sub-loss values are obtained, a segmentation loss value according to an average of the M segmentation sub-loss values, the M segmentation sub-loss values comprising the target segmentation sub-loss value; and updating the expression transfer model by minimizing the identity loss value, the discriminative loss value, the generative loss value, the classification loss value and the segmentation loss value, the discriminative loss value and the generative loss value being determined according to the discriminative loss function and the generative loss function, and the classification loss value being determined according to the category feature vector; and obtaining, when the model convergence condition is reached, the expression transfer model according to an updated model parameter.

17. The non-transitory computer readable storage medium according to claim 13, wherein the updating, according to the identity loss value, the category feature vector, the discriminative loss function and the generative loss function, the expression transfer model to reduce the difference between the synthesized facial image and the target domain facial image comprises:

using, according to the discriminative loss function and the generative loss function, to determine a discriminative loss value and a generative loss value;

using, according to the category feature vector, to determine a classification loss value;

using, according to a first boundary feature corresponding to the synthesized facial image and a second boundary feature corresponding to the target domain facial image, to obtain a boundary loss value;

using, according to the synthesized facial image, the target domain facial image and a facial segmentation region corresponding to the target domain facial image, to obtain a segmentation loss value; and updating the expression transfer model by minimizing the identity loss value, the discriminative loss value, the generative loss value, the classification loss value, the boundary loss value and the segmentation loss value until the model convergence condition is reached.

* * * * *